US008496817B2

(12) United States Patent
Just

(10) Patent No.: US 8,496,817 B2
(45) Date of Patent: Jul. 30, 2013

(54) DECHLORINATOR AND METHOD OF DECHLORINATION

(76) Inventor: Erwin Just, Scarborough (CA)

( * ) Notice: Subject to any disclaimer, the term of this patent is extended or adjusted under 35 U.S.C. 154(b) by 605 days.

(21) Appl. No.: 12/760,990

(22) Filed: Apr. 15, 2010

(65) Prior Publication Data

US 2011/0094949 A1    Apr. 28, 2011

Related U.S. Application Data

(60) Provisional application No. 61/202,909, filed on Apr. 17, 2009.

(51) Int. Cl.
*B01D 15/00* (2006.01)
*B01D 35/00* (2006.01)
*B01J 20/00* (2006.01)

(52) U.S. Cl.
USPC .......... 210/198.1; 210/85; 210/205; 210/136; 210/199; 210/206; 210/747.8; 210/748.04; 210/749; 210/757

(58) Field of Classification Search
None
See application file for complete search history.

(56) References Cited

U.S. PATENT DOCUMENTS

| 3,443,366 | A | * | 5/1969 | Schwab ............... 55/309 |
| D228,655 | S | | 10/1973 | Frascone |
| 4,208,376 | A | | 6/1980 | Sangter et al. |
| 4,816,177 | A | | 3/1989 | Nelson et al. |
| 4,822,571 | A | | 4/1989 | Nicholson et al. |
| 5,090,446 | A | | 2/1992 | Hunter et al. |
| 5,350,512 | A | | 9/1994 | Tang |
| 5,384,102 | A | | 1/1995 | Ferguson et al. |
| 5,405,540 | A | | 4/1995 | Tang |
| 5,407,567 | A | | 4/1995 | Newhard |
| 5,409,604 | A | | 4/1995 | Graves |
| 5,413,149 | A | * | 5/1995 | Ford et al. ............... 138/123 |
| 5,427,748 | A | | 6/1995 | Wiedrich et al. |
| 6,117,316 | A | | 9/2000 | Burton |
| 6,221,257 | B1 | | 4/2001 | Grim |
| 6,227,463 | B1 | | 5/2001 | Porter |
| 6,294,096 | B1 | | 9/2001 | Pate |
| 6,298,871 | B1 | | 10/2001 | Pickens et al. |
| 7,137,568 | B1 | | 11/2006 | LaCrosse |
| 7,150,827 | B1 | | 12/2006 | Grenning |
| 7,291,261 | B1 | | 11/2007 | Rhodes |
| 2002/0195404 | A1 | | 12/2002 | Pickens et al. |

(Continued)

FOREIGN PATENT DOCUMENTS

| EP | 0211294 A2 | 2/1987 |
| WO | WO 9529001 | 11/1995 |
| WO | WO 0248048 | 6/2002 |

OTHER PUBLICATIONS

Office Action issued May 18, 2011 in respect of corresponding Canadian Patent Application No. 2,700,703.

(Continued)

*Primary Examiner* — Dirk Bass
(74) *Attorney, Agent, or Firm* — Bereskin & Parr LLP/S.E.N.C.R.L., s.r.l.

(57) ABSTRACT

A dechlorinator for dechlorinating a stream of water comprises a housing comprising an inlet and an outlet. The housing defines a flow path between the inlet and the outlet. A filter is operatively supported in the housing and located in the flow path. At least one dechlorinating tablet is operatively supported in the housing and located in the flow path downstream of the filter for dechlorinating water flowing from the filter to the outlet.

26 Claims, 29 Drawing Sheets

U.S. PATENT DOCUMENTS

| | | | |
|---|---|---|---|
| 2003/0127381 A1 | 7/2003 | Gsell | |
| 2003/0192835 A1 | 10/2003 | Wilkinson | |
| 2008/0164221 A1* | 7/2008 | Brownstein et al. | 210/767 |
| 2008/0217258 A1 | 9/2008 | Buchan | |

OTHER PUBLICATIONS

Cheap Swimming Pool Products, www.cheappoolproducts.com, Internet Site.
Arden Innovators in Water Treatment Technology, Terminator System, Chlorine Tablet Feeder, www.ardenindustries.com, Arden Industries, Shingle Springs, USA.
LPD-250 and LPD-250A Dechlorinating Diffusers, Pollardwater.com.
Vita-D-Chlor™ Ascorbic Acid Tablets, Pollardwater.com.
LPD-CHLOR Dechlorination Tablets, Pollardwater.com.
LPD-250 Low Flow Inserts, Pollardwater.com.
Dechlorination Index, Pollardwater.com.
Ganesh et al., Guidance Manual for the Disposal of Chlorinated Water, copied with permission by Pollardwater.com.
Bio-Dynamic® Tablet Feeders, Bio-Sanitizer® Disinfecting Tablets, Bio-Gem® Organic Digester, www.norweco.com, Norweco, Inc., Norwalk, USA.
Bio-Neutralizer® Dechlorination Tablets, Norweco®, USA.
Swimming Pools, Hot Tubs and Spas, City of Toronto—Toronto Water Division, www.toronto.ca/water, Toronto, Canada.
Swimming Pools, Hot Tubs and Spas—Important Information . . . complying with the City's Sewer Use By-law, http://www.toronto.ca/water/protecting_quality/pollution_prevention/swimmingpools.htm, ©City of Toronto.
Environmental Best Management Practices for Private Swimming Pools, Hot Tubs/Spas in the City of Toronto, City of Toronto—Toronto Water Division, Toronto, Canada.
Toronto Municipal Code—Sewers, 681-35 to 681-36.
Ganesh et al., Guidance Manual for the Disposal of Chlorinated Water, copied with permission by Integra Chemical Company, Renton, USA.
Perform-Max™ Pool Sanitizer Instruction Manual, Models 920,940 and 980 (In-line) and Model 960 (Off-line).
Aquatic Parts Company Online, Olympic Auto Chlorine Feeder ACM-94; King Tech New Water/Frog-Ing 5600; Hayward Chlorine/Bromine CL-200.
Canplas® Backwater Valves, Canplas Inc., Colorado, USA.
Vu-Flow T Style Screen Filters, VFNT6OSC3OSS—Vu-Flow Replacement Filter 30 mesh-1 1/2 Stainless Steel, www.sprinklerwarehouse.com.
Rittenhouse, TeeJet Series AA126 in Line Strainers; Teejet Series 122 Line Strainers, www.rittenhouse.ca.
Rain Bird Basket Filter, www.rainbird com, Rain Bird Corporation, Tucson, USA.
Waterway Pool Valves/TruSeal Diverter Valves and Swing Check Valves.
Polylok™ 2" Pressure Filter, www.polylok.com, Wallingford, USA.
Effluent Filter EFT-080 Installation Guide and Owner's Manual, www.premiertechaqua.com, Premier Tech Environment, Rivière-du-Loup, Canada.
Sch. 40 Chlorine Feeder and Bio-Dynamic® Model LF 1000 Dry Chemical Tablet Feeder, www.septicsolutions.net.
"Big Blue" Industrial Filter Housing FF-0158-70, www.coleparmer.ca.
Ron-Vik, Inc., In-Line Strainers, www.ron-vik.com.
30" x 48" Jumbo Slime Bag™; Super Slime Bags™; 30" 36" Backwash/DE Slime Bag™; 18" x 30" Vacuum/X-tra Polishing Bag™; 12" x 30" Polishing Bag™; 9" x 30" Filler'-Up Bag™, 24" x 36" Bye Guanide Bag™ www.cleanerpools.net.
Bio-Max® Dechlorination Tablets, www.norweco.com, Norweco, Norwalk, USA.
Dechlorination Tablets, Tramfloc, Inc., Tempe, USA.
Dechlorination Tablets, PumpStoreUSA.com, http://www.gongol.net/store/dechlorinationtablets/, West Des Moines, USA.
Brominators & Chlorine Dioxide Generators FAQs, Derwent Water Services Limited, derwentwater.com, Derbyshire, UK.
Dechlorinator, Central Spa and Pool Supply, http://www.centralspasupply.com/Site_2008/promos_2008.htm.
Chlorinators, Chlorine Feeder, Waterway Plastics product catalogue, http://www.waterwayplastics.com/catalogs/2010_08_poolchlormisc.pdf, p. 59.
Tri-Max Tablet Feeder by Norweco, DJ Gongol & Associates, Inc. ,http://www.gongol.net/assets/store/chlorination/norwecotrimax.pdf, Norwalk, USA.
Rittenhouse, Teejet Series 122 Line Strainers, rittenhouse.ca.
Hayward CL 200 Automatic Chemical Feeders, www.haywardnet.com, Hayward Industries, Inc.
Norweco Compact LF Series Bio-Dynamic® Dechlorination Tablet Feeders, www.norweco.com.
Vita-D-Chlor Bazooka Tablet Dechlorination System, www.Vita-D_Chlor.com Integra Chemical.
Exceltec Model 1000 Dechlorinator, www.pollutioncontrolsystem.com/downloads/Sanuril1000.pdf, Sugar Land, USA.
Arden Bazooka Liquid Dechlorinator, www.pollardwater.com.
Rittenhouse Gardn Gro Dechlorinator, www.rittenhouse.ca.

\* cited by examiner

DECHLORINATOR AND METHOD OF DECHLORINATION

CROSS REFERENCES TO RELATED APPLICATIONS

This application claims priority from U.S. Provisional Patent Application No. 61/202,909, filed on Apr. 17, 2009, which is incorporated herein by reference in its entirety.

FIELD

The disclosure relates to a method and apparatus for dechlorinating water which is to be removed from a given location and directed to a drain, river, stream, sewer, or any other desired location. The method and apparatus may include filtering the waste water before it is dechlorinated. The disclosure particularly relates to, but is not limited to, dechlorinating water which is removed from residential swimming pools.

BACKGROUND

Residential swimming pools contain a great deal of water (often 80,000 liters or more), and water must periodically be pumped out of these pools. A common reason for this is to use the removed water for backwashing the pool filter. As is well-known, when the filter is backwashed, water pumped from the pool is forced through the filter in a backwards direction (i.e., opposite to the normal direction of flow through the pool filter). The reverse flow of water cleans dirt and debris from the filter media (usually sand, but other materials such as diatomaceous earth can be used, in which case their pipe and valve arrangements can vary from those described which are for sand). The water used to clean the pool filter is now laden with dirt from the filter and in some cases with some of the filter media and is not normally directed back into the pool (since this would require that it be cleaned). Instead, the backwash water is directed out a backwash hose, typically to a storm sewer (usually by discharging the water onto a road). In some cases, the backwash water is sent to a sanitary sewer. In either case, the backwash water may contain an undesirable level of chlorine. Such chlorine can create environmental damage. Even the dirt load contained in the water may create undesirable consequences for the environment.

There may be other reasons (unrelated to backwashing) for removing water from a swimming pool. For example, the pool level may need to be lowered, e.g. due to excess rain, fall closing, cleaning of the pool, changing the liner, painting or repairing. However, this water may also contain chlorine and should be dechlorinated. For simplicity, all such water to be discharged will be referred to as "discharge water" or "backwash water" or "waste water".

SUMMARY

In the past, the need to dechlorinate pool discharge water has been partly met by processing the backwash water through dechlorination devices. However, these prior dechlorination devices have been complex, costly, and difficult to use. The prior devices also allowed the dechlorinating tablets which they used to soak in water between dechlorination uses, causing the tablets to decay prematurely.

In one aspect of the invention, the disclosure provides a dechlorination apparatus for dechlorinating swimming pool discharge water (e.g. during pool filter backwashing, or when the pool level is lowered for improved operation, or for winterizing, or when the pool is drained for repair or maintenance.

According to one aspect, a dechlorinator for dechlorinating a stream of water comprises a housing comprising an inlet and an outlet. The housing defines a flow path between the inlet and the outlet. A filter is operatively supported in the housing and located in the flow path. At least one dechlorinating tablet is operatively supported in the housing and located in the flow path downstream of the filter for dechlorinating water flowing from the filter to the outlet.

The housing may comprise a top portion and a bottom portion, and the inlet may be located in the top portion and the outlet may be located in the bottom portion.

The dechlorinator may further comprise a tablet support located within the housing for supporting the at least one dechlorinating tablet in the flow path.

The dechlorinator may further comprise a filter support located within the housing for supporting the filter in the flow path.

The tablet support may be seated on the bottom portion, and the filter support may be seated on the tablet support.

The housing may comprise an inwardly projecting formation, the tablet support may be suspended from the inwardly projecting formation, and the filter support may be nested within the tablet support.

The filter may be a bag filter.

The outlet may be located in a bottom surface of the housing, and the at least one dechlorinating tablet may be spaced from and above the bottom surface.

The housing may comprise a top portion and a bottom portion, and an air-induction valve may be located in the top portion. The air induction valve may be in fluid communication with the flow path. The air-induction valve may be a check valve adapted to allow air to enter the flow path, and adapted to substantially prevent water from exiting the flow path.

The at least one dechlorination tablet may be housed within a tablet holder located within the housing. The tablet holder may limit the velocity of water contacting or eroding the at least one tablet. The tablet holder may be rigidly constructed or made of a porous fabric and may have a means of adjusting water volume and velocity contacting the tablet(s).

The dechlorinator may further comprise a pressure relief valve mounted to the housing.

The dechlorinator may further comprise a drain in the housing. The drain may be separate from the outlet.

The inlet and outlet may each be mountable to a hose.

According to another aspect, a dechlorinator for dechlorinating a stream of water flowing from a conduit comprises a fitting comprising an inlet end and an outlet end and defining a flow-passage between the inlet end and the outlet end. The inlet end of the fitting is adapted for connection to the conduit such that the flow passage is in communication with the conduit. A filter bag is adapted to filter the water flowing out of the flow passage of the fitting. The filter bag comprises an upstream open end and defines an interior volume. The open end is removably securable to the outlet end of the fitting such that water exiting the flow passage enters the interior volume of the filter bag and flows through the filter bag. The dechlorinator further comprises a porous dechlorination bag comprising an upstream open end and an interior volume. The open end of the dechlorination bag is removably securable to the fitting over the open end of the filter bag and the filter bag is removably receivable within the dechlorination bag, such that water exiting the filter bag enters the interior volume of the dechlorination bag. At least one dechlorination tablet is located in the dechlorination bag.

The dechlorinator may further comprise a tube comprising a first open end and a longitudinally opposed second open end. The first open end of the tube may be secured to the fitting over the dechlorination bag. The filter bag and dechlorination bag may be at least partially received in the tube, such that water exiting the dechlorination bag exits the second open end of the tube. The tube may be constructed from a flexible material. An indicia indicating that dechlorination is taking place within the tube may be displayed on the tube. The tube may focus the stream of water over the tablets.

The dechlorination bag may be longer than the filter bag.

The dechlorination bag and filter bag may be constructed from a flexible material.

A pore size of the dechlorination bag may be greater than a pore size of the filter bag.

According to another aspect, a dechlorinator for dechlorinating a stream of water comprises a fitting defining a flow passage therethrough. The fitting is removably securable to a water conduit such that the flow passage is in fluid communication with the water conduit. The dechlorinator further comprises a porous bag. The porous bag comprises a filter compartment having an upstream open end securable to the fitting such that water exiting the flow passage enters the filter compartment and flows through the porous bag, and a dechlorination compartment positioned downstream of the filter compartment such that at least a portion of the water exiting the filter compartment enters the dechlorination compartment. At least one dechlorination tablet is located within the dechlorination compartment.

The dechlorination compartment may define an opening for the insertion of the dechlorination tablet.

The dechlorinator may further comprise a clamp for securing the porous bag to the fitting.

The dechlorinator may further comprise a tube having a first open end and a longitudinally opposed second open end. The first open end of the tube may be secured to the fitting over the porous bag, and the porous bag may be least partially received in the tube, such that water exiting the porous bag exits the second open end of the tube. The tube may be made from a flexible material. An indicia indicating that dechlorination is taking place within the tube may be displayed on the tube. The tube may focus the stream of water over the tablet(s).

The porous bag may be one piece. The porous bag may be a mesh.

The filter compartment and dechlorination compartment may be integral with the porous bag.

According to another aspect, a dechlorinator for dechlorinating a stream of water, comprising a housing comprising a bottom surface, and an inlet and an outlet. The housing defines a flow path between the inlet and the outlet. The outlet is located at an elevation not substantially higher than the bottom surface. At least one dechlorinating tablet is operatively supported in the housing at an elevation above the bottom surface. At least a portion of the tablet is located in the flow path. An air induction valve is located in the housing and is in fluid communication with the flow path.

The dechlorinator may, further comprise a filter operatively supported in the housing and located in the flow path upstream of the dechlorinating tablet.

DETAILED DESCRIPTION

Figure 1:
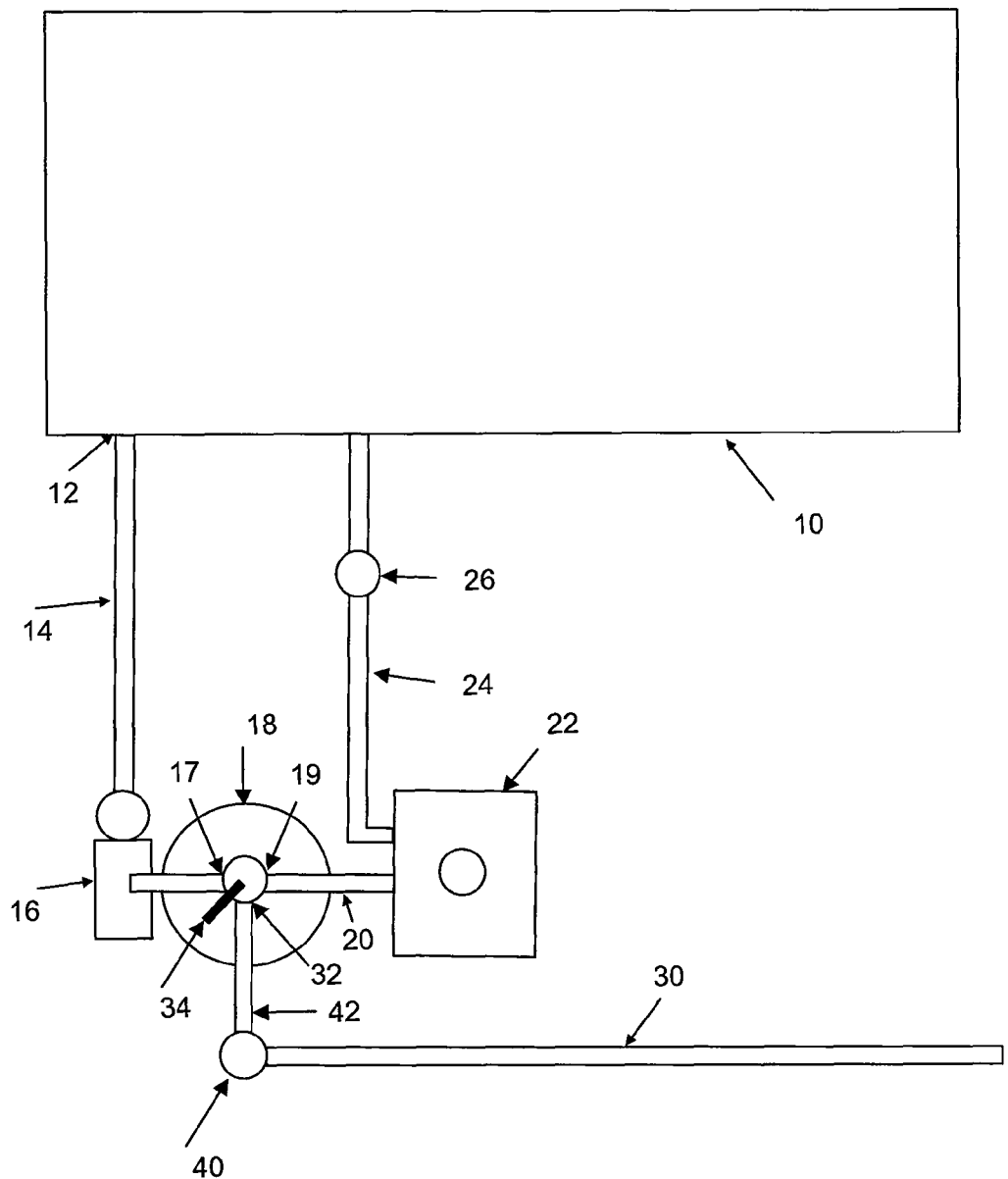
FIG. 1 is a diagrammatic view of a swimming pool and associated equipment, in simplified form, showing the main pool elements, including a dechlorinator, and their connections.

Reference is first made to FIG. 1, which shows a conventional swimming pool 10 having an outlet diagrammatically indicated at 12. Outlet 12 is usually a combined outlet which takes the combined flow from a skimmer and from a lower or main drain (not shown) in the pool.

Water flows from the pool outlet 12 through a pool outlet pipe 14 to a pool pump 16. From the pump 16, the water (which may contain some suspended debris) is directed into a pool filter inlet 17 and through a pool filter 18, which filters the water flowing through it. The pool filter 18 may use any common filter media, e.g. sand or diatomaceous earth, or a cartridge filter (either washable or disposable).

The clean water from the pool filter 18 passes through a pool filter outlet 19 and a pool filter outlet pipe 20 to a heater 22. The heated clean water from the heater 22 returns to the pool through a return pipe 24 (and usually is distributed back into the pool through one or more inlets not shown). There may also be a variety of other accessories and equipment connected to the water flow path, including automatic chlorinators (such as that shown at 26 in FIG. 1), automatic pool cleaners with and without associated pumps (not shown), slides and pool toys needing water flow, and the like. Some swimming pools will not have a heater and the water flow returns directly to the pool via return pipe 24.

FIG. 1 also shows a backwash hose 30 for the pool. The backwash hose 30 normally receives backwash water from a conventional backwash outlet 32 of the pool filter 18. The backwash hose 30 may take the form of a rigid pipe and may also be buried underground (pool water will not usually need to be dechlorinated or filtered if discharged to the sanitary sewer). However, more usually, backwash water is discharged onto any convenient nearby road (from which it flows into a storm sewer, or into a ditch). In such cases, the backwash hose 30 is usually connected to the pool filter 18 when the pool is being backwashed. In this situation, the backwash hose 30 is usually long and is made of very thin flexible plastic, so that after backwashing, the backwash hose 30 can be rolled up and either stored until its next use, or moved and used on other pools.

For performing backwashing, the pool filter 18 has a conventional handle or control 34 which can be set in a "filter" position (usually by being rotated). (The various positions of the control 34 are not specifically shown.) The control 34 can be further set in a "backwash" position (not specifically shown) for backwashing the pool. (The pump 16 is stopped while the filter control 34 is being set.) As is well-known, when the filter control 34 is set to the filter position, water from the pump 16 flows into the filter inlet 17 and through the filter media and is thereby cleaned, and then is returned to the pool 10 via filter clean water outlet 19 and pipes 20, 24. When the filter control 34 is set to the backwash position, water entering the filter inlet 17 from the pump 16 is directed to flow in a reverse direction through the filter media, to flush debris out of the filter media. This debris laden water leaves the filter 18 via filter backwash outlet 32 and travels through backwash hose 30 to a desired location for discharge. The filter control 34 usually also has a "waste" or "drain" position (most sand filters have five settings; not all are specifically shown), in which water removed from the pool 10 by pump 16 is sent directly from the filter inlet 17 to the filter backwash outlet 32, bypassing the filter media. This setting is used when it is desired to lower the pool water level, discharging more water than is needed for backwashing the filter 18.

Figure 2:
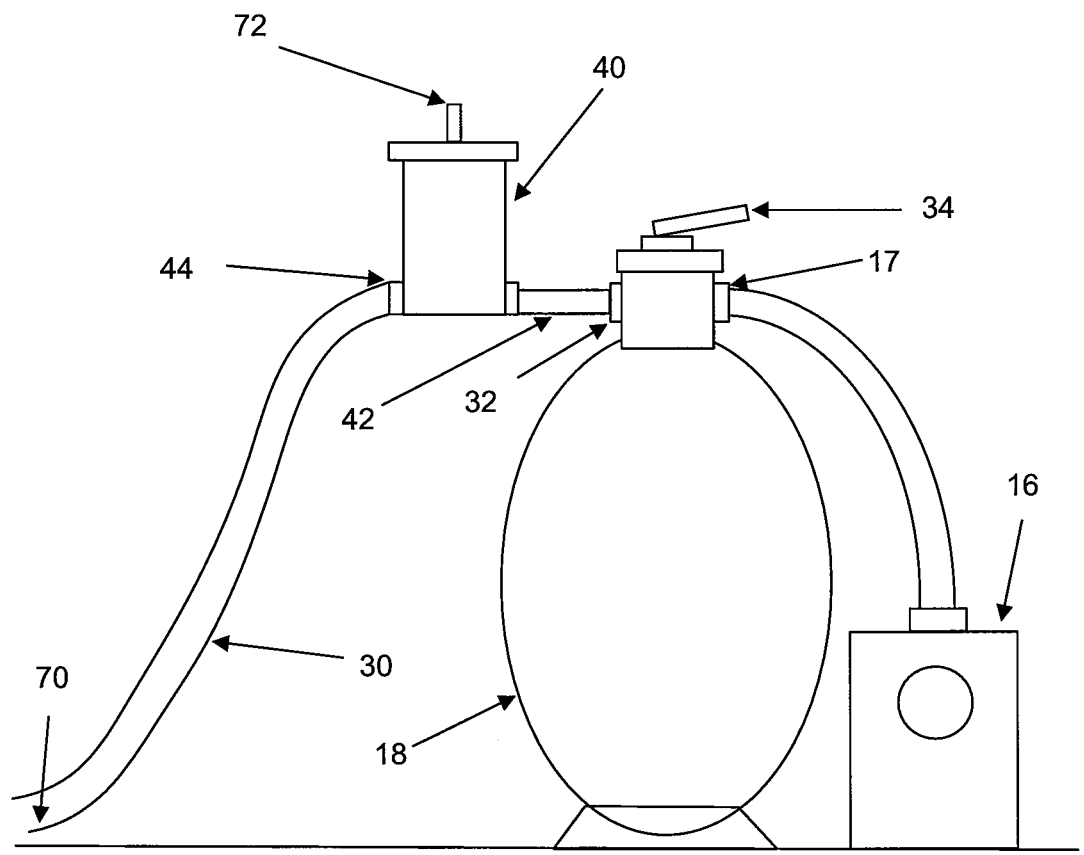
FIG. 2 is a diagrammatic view of a first form of a fixedly mounted dechlorinator.

In one aspect, a dechlorinator 40 is inserted into the discharge water flow path as shown in FIG. 1, for dechlorinating the stream of water in the discharge water flow path. A connection arrangement for the dechlorinator 40 is shown in FIG. 2, where the dechlorinator 40 is rigidly attached to the discharge water outlet 32 of the pool filter 18 by a short rigid pipe section 42 (as seen in FIG. 1), using conventional hose clamps (or by other means not specifically shown). The dechlorinator 40 in turn has an outlet 44 to which the backwash hose 30 is connected.

Figure 3A:
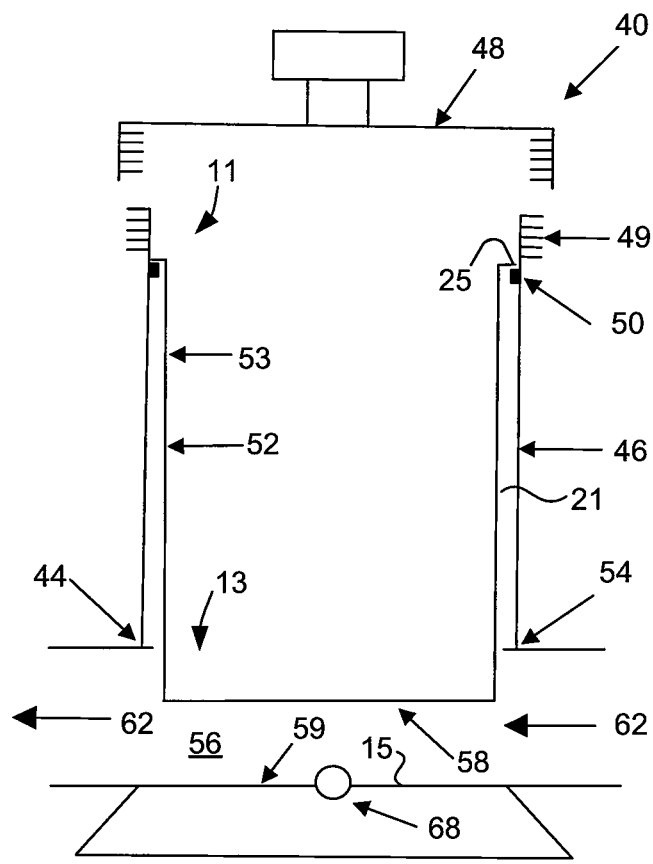
FIG. 3A is a side sectional view showing diagrammatically the structure of a dechlorinator but without dechlorinating tablets.

FIG. 3A is a cross-sectional view of an exemplary embodiment of dechlorinator 40. The dechlorinator 40 has a generally cylindrical body or housing 46 closed at its top preferably by a screw-on lid 48 (which connects to threads 49 of the housing 46). The housing has a top portion 11 and a bottom portion 13. The bottom portion defines a bottom surface 15 of the housing 46.

The dechlorinator 40 also includes a discharge water inlet 54 connected to the rigid pipe 42. Pipe 42 thus serves both to support the dechlorinator 40 and also to provide a flow of water into the dechlorinator 40. A flow path is provided in the housing 46 between the inlet 54 and the outlet 44. In the embodiment as shown, the dechlorinator inlet 54 is located in the bottom portion 13, at or adjacent the bottom surface 15 of the dechlorinator 40, and the dechlorinator outlet 44 is similarly located, and is on the opposite side of the dechlorinator from the inlet (i.e. the two are 180° opposed). This creates a chamber 56 at the bottom of the dechlorinator 40. The bottom surface 15 of the dechlorinator also forms the bottom surface 15 of the chamber 56.

Figure 3B:
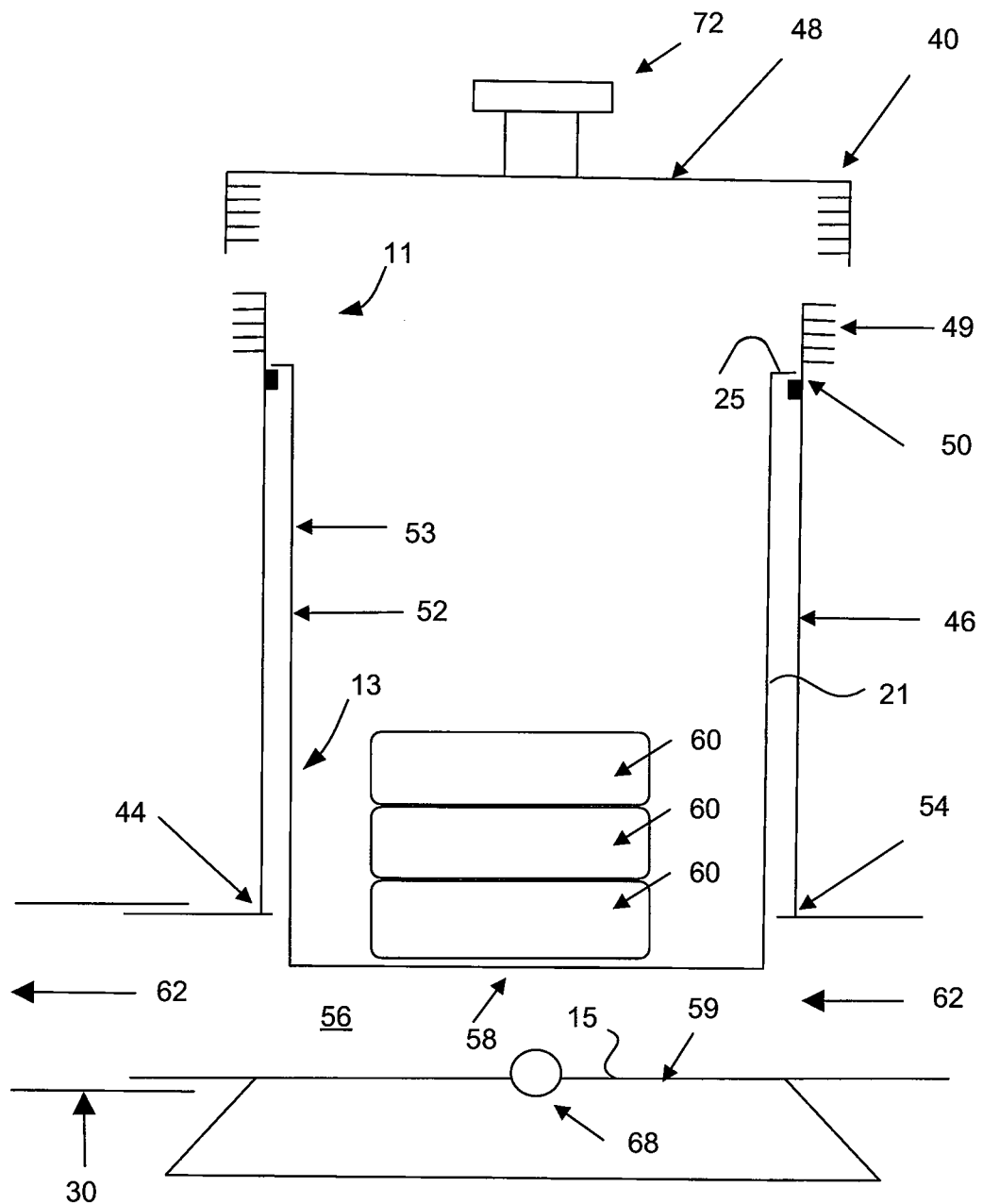
FIG. 3B is a side sectional view similar to that of FIG. 3A but showing the positioning of dechlorinating tablets in the device.

Referring to FIG. 3B, at least one dechlorinating tablet 60 is supported in the housing 46, and at least a portion of the dechlorinating tablet 60 is located in the flow path for dechlorinating water flowing from the inlet 54 to the outlet 44. The dechlorinator 40 may include a tablet support 21 located within the housing 46 for supporting the dechlorinating tablet 60 in the flow path. In the embodiment shown, the tablet support includes a perforated basket 52. An inwardly projecting annular formation or ridge 50 is provided in the housing 46, near but below the top of housing 46. The perforated basket 52 is suspended from the ridge 50 by a lip 25, so that the ridge 50 supports the perforated basket 52. The perforated basket 52 is sized so that its perforated lower surface 58 hangs about half way down (or slightly less) into the bottom chamber 56 (as measured from the tops of the inlet and outlet 44, 54 to the bottom 59 of chamber 56).

The dechlorinating tablets 60 may be conventional commercially available tablets readily available from various sources. For example, a common type of commercially available dechlorination tablets includes concentrated sodium sulfite as its active dechlorinating ingredient and is made in tablet form. The tablets 60 may also include conventional inert ingredients so that the tablets will hold their form and will dissolve at a desired rate. Such tablets are available under the brand Bio-Max, from Norweco of Norwalk, Ohio, and also are available from Pollard Water of Hyde Park, N.Y.

Other dechlorinating ingredients may also be used, e.g. Integra Chemical Company uses citric acid as an active ingredient for some of its dechlorinating tablets. A variety of different kinds of dechlorinating tablets are available.

In operation, when the pool filter is to be backwashed, the backwash control 34 is operated to direct water from the pump 16 through the pool filter 18 in a direction that will flush debris out of the filter media, and the resultant backwash water is then directed from filter backwash outlet 32 through pipe 42 to the dechlorinator 40. As will be apparent from FIGS. 3A, 3B, and the arrows 62 which show the flow path, backwash water enters the dechlorinator 40 at inlet 54, flows into and through perforated basket 52, and contacts the part of the tablets 60 hanging (in perforated basket 52) in the bottom chamber 56. The flowing water normally fills pipe 42, inlet 54, chamber 56, and outlet 44. The water level inside the dechlorinator housing 46 may at times rise above the level of the inlet 54 and outlet 44, due to the pressure in the backwash hose. Whether or not this occurs, the brief contact between the water flowing through chamber 56, and the one or more tablets 60 hanging into chamber 56 and exposed to the water stream flowing therethrough, is sufficient to dechlorinate the backwash water. The dechlorinated water then travels through the backwash hose 30, which is connected to the dechlorinator backwash outlet 44 by any desired means (e.g. a hose clamp, not shown). The backwash water leaving the hose 30 preferably contains substantially no chlorine and may be discharged onto a road, or another place if approved by the local municipality.

Because the dechlorinating tablets 60 are highly soluble, if they were left sitting in water when the dechlorinator 40 is between uses, they may rapidly dissolve and would then no longer be available for use when needed. Therefore, it will be seen that the perforated lower surface 58 of the basket 52 holds the bottom of the tablets 60 above the bottom surface 15 of the bottom chamber 56 of the dechlorinator 40 (but low enough so that flowing water will contact at least a part of one tablet 60 when a stream of discharge water flows through the dechlorinator 40). In addition, the outlet of the backwash hose 30 is below the level of the outlet 44 of the dechlorinator 40. The reason for this is so that after the pool filter 18 has been backwashed and water from the pump 16 is redirected back to the pool (e.g. through the heater 22) and flow through the dechlorinator 40 ceases, then during this inactive period of time (for the dechlorinator 40), if the tablets 60 were left sitting in water, they may be subjected to an unnecessary and undesirable dissolving action. This may shorten the tablet life and would make them unavailable for use later. In addition, during the next backwash, the initial portion of the backwash water being discharged onto the road during that next use could contain too much dechlorinating ingredient, from the initial emptying of chamber 56. This may be undesirable.

Since as shown the tablets 60 are suspended above the bottom surface 15 of the chamber 56 by the basket 52, the bottom chamber 56 may be drained down to a level below that of the lower surface 58 of the basket 52 (i.e. below the lowest tablet 60), to avoid the above occurrence. Even if some water remains on the bottom surface 15 of the chamber 56 of FIG. 3B, such water may not contact tablet 60 and therefore may not cause premature decay of the tablet(s) 60 or other potential problems. (However, for winterizing a manually removable drain plug 68 is provided at the bottom of chamber 56 for dechlorinators depicted in FIGS. 3a and 3b.)

Although placing the backwash hose outlet (indicated at 70 in FIG. 2) below the dechlorinator outlet 44 should lead to draining of chamber 56 to a level below the bottom surface 58 of the tablet support basket 52, an air lock could occur in the system and prevent drainage to the desired level. Therefore, as shown in the drawings, the dechlorinator 40 may include a conventional air induction valve 72, which is adapted to allow air to enter the flow path, and to substantially prevent water from exiting the flow path As shown, the air induction valve is located in the top portion 11 of the housing, and is in fluid communication with the flow path. If water has accumulated in a lower portion of the dechlorinator housing 46 after backwashing has finished, the suction caused by the weight of the water sitting in the dechlorinator above the outlet 44 will open the air induction valve 72, allowing air to flow through valve 72 into the housing 46 and thereby allowing the dechlorinator 40 to finish draining.

In summary, after backwashing has been completed, the backwash hose 30 and the bottom chamber 56 in the dechlorinator 40 will normally self-drain and will be dry, or may have only a small amount of water therein. Since the tablets 60 are suspended above the bottom of chamber 56, they are above the level of any water that may remain and therefore the life and duty cycles of the tablets 60 are extended. In addition, when a backwash operation begins, any excess concentration of materials from the tablets 60 in the initial backwash water flow is avoided.

Figure 4:
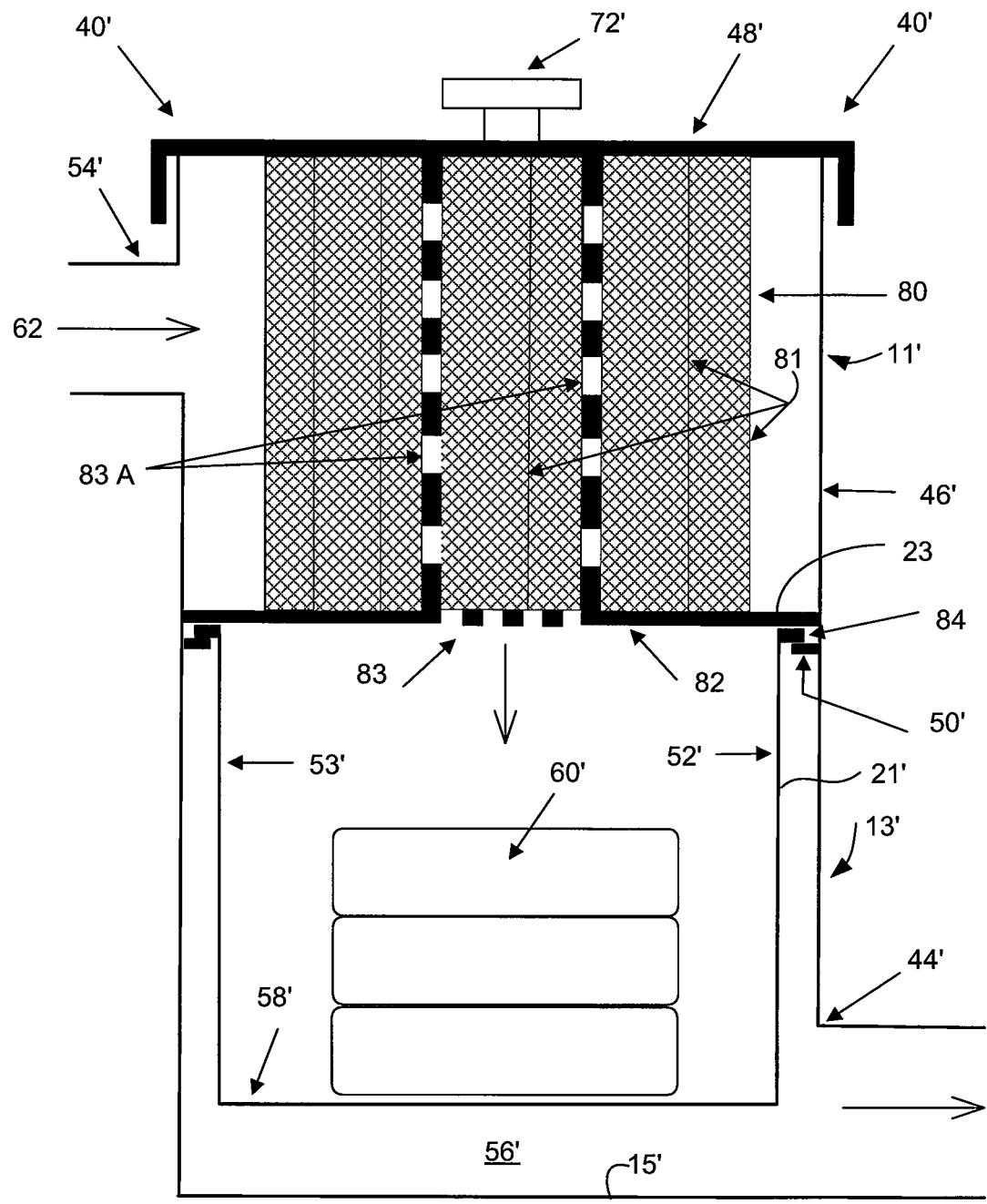
FIG. 4 is a side sectional view similar to that of FIGS. 3A, 3B but showing a modified form of dechlorinator having a filter therein.

Many different flow path arrangements can be used in the dechlorinator 40. For example, as shown in FIG. 4 where primed reference numerals indicate parts corresponding to those of FIGS. 1 to 3, the dechlorinator inlet 54' can be located in the top portion 11' of the dechlorinator housing 46', while the outlet 44' remains as before in the bottom portion 13 of the dechlorinator 40'. As in the FIGS. 3A, 3B version, the dechlorinating tablets 60' are supported by a tablet support 21', which in the embodiment shown is a removable perforated basket 52', which is in turn supported by an inwardly projecting ridge 50' on the interior surface of the housing 46'. The lowermost dechlorinating tablet 60', as before, is suspended above the bottom surface 15' of the lower chamber 56' in the dechlorinator.

However, the dechlorinator 40' shown in FIG. 4 differs further from that shown in FIGS. 3A, 3B in that the dechlorinator 40' includes a filter 80 supported in the housing and located in the flow path to clean the backwash water before the backwash water is discharged. The dechlorinating tablets 60' are located downstream of the filter 80 for dechlorinating the water flowing from the filter 80 to the outlet 44'.

In the embodiment shown, the filter 80 is any suitable cartridge filter having pleats 81 to increase its surface area, and is supported on a perforated plate 82.

The dechlorinator may further comprise a filter support 23 located within the housing for supporting the filter 80 in the flow path. In the embodiment shown, the filter support 23 is a plate 82. Plate 82 has a perforated center 83 which is aligned with the central axial opening 83A which is conventional in cartridge filters. The filter 80 is pressed securely between the lid 48 and the plate 82 when the lid 48 is fastened onto housing 46. Plate 82 in turn rests on an upper outwardly turned lip 84 of the tablet basket 52', which in turn rests on the ridge 50'.

In use of the dechlorinator 40', a stream of backwash water enters dechlorinator inlet 54', travels through the cartridge filter 80, where debris is removed, and then travels through the cartridge opening 83A and through the perforations 83 in the perforated plate 82 to the dechlorinating tablets 60', where chlorine is removed. The resultant filtered and dechlorinated backwash water leaves the dechlorinator at outlet 44' and may then be carried by the backwash hose 30 for discharge onto a road or into a storm sewer. The cartridge filter 80 can be disposable, or it can be one which can be cleaned and reinstalled. The filter 80 can also be a bag filter (using a modified arrangement for support). Access to the filter 80, and to the tablets 60', is as before gained by unscrewing the dechlorinator lid 48'.

As before, an air induction valve 72' is mounted on the dechlorinator lid 48' (or in any other convenient elevated position), to help prevent water from remaining in the dechlorinator after backwashing.

In applications in which the dechlorinator 40 includes a filter which could clog, it is desirable that a pressure relief valve be installed in the system, preferably close to the pool's filter 18 and in a position such that the operator can easily see the pressure relief valve and can also see when the pressure relief valve has opened due to an overpressure in the system.

The reason for this is that when a pool is being backwashed, normally the pressure in the backwash circuit is low (usually less than 5 psi). However, if substantial debris is being backwashed from the pool filter 18, e.g. if algae is being cleaned from the filter 18, or if excess debris is being removed from the pool filter 18, then the dechlorinator filter 80 (if it has small pores to filter out fine suspended debris) can clog very quickly. The rapid clogging can cause a sudden pressure rise in the line and in equipment upstream of the dechlorinator 40. In the arrangement shown in FIG. 1, the equipment subject to the overpressure will be the pool filter 18 and the pool pump 16 (and any other pipe, connections or fittings between pool pump 16 and dechlorinator 40). However, as will be described in more detail below, a version of the dechlorinator may be installed at the discharge end of the backwash hose 30. In that case, the backwash hose 30 will also be subject to the overpressure and may rupture. This would be extremely undesirable.

Figure 4A:
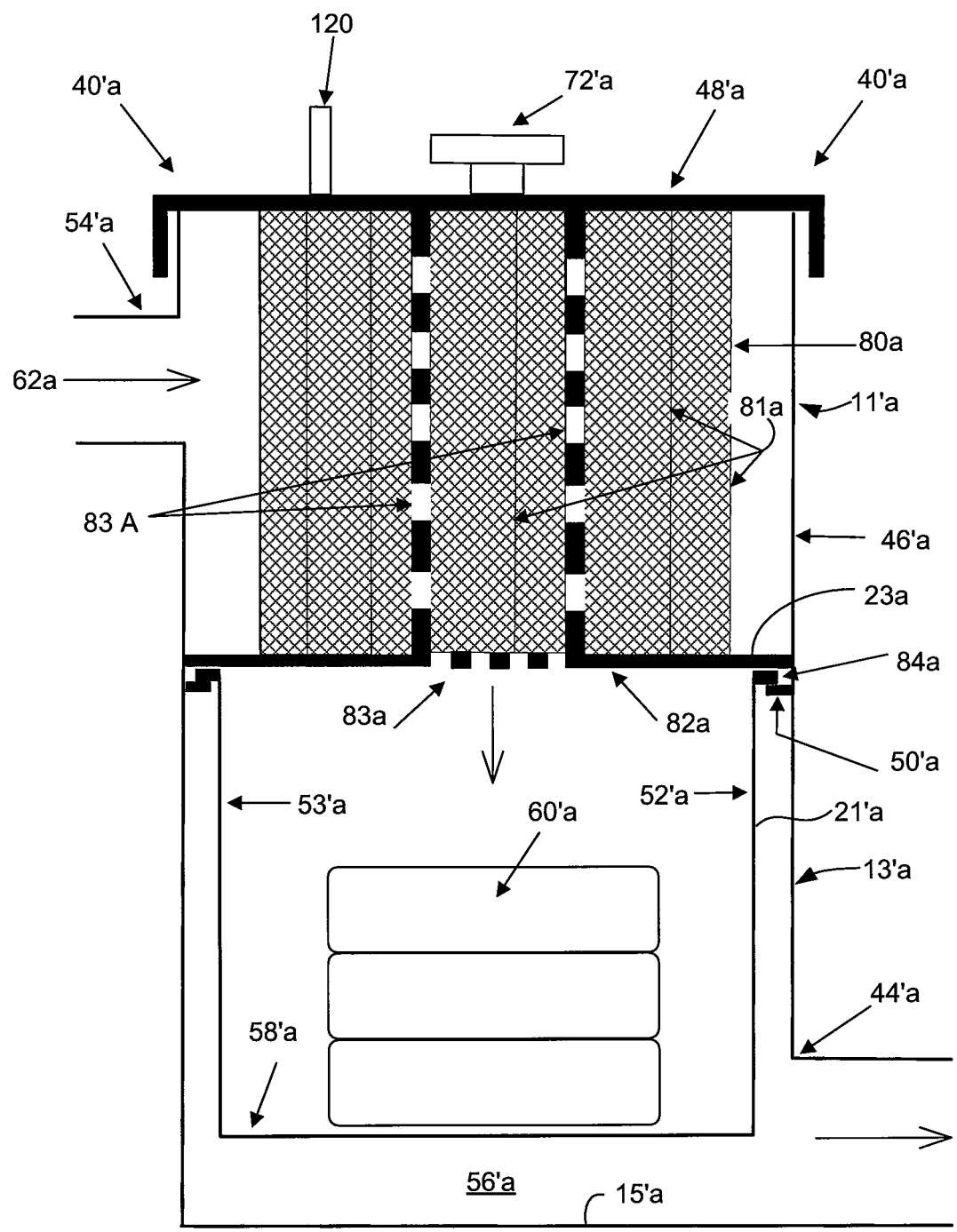
FIG. 4A is a side sectional view showing another embodiment, similar to that of FIG. 4, but showing a pressure relief valve and a drain plug.

Referring to FIG. 4A, where reference numerals ending with an 'a' indicate parts corresponding to those of FIG. 4, to reduce the likelihood of an overpressure (particularly a sudden one) from occurring and causing damage, due to clogging of the dechlorinator filter 80a and before the pressure problem is noticed, a pressure relief valve 120 may be installed in the system. In the embodiment shown in FIG. 4A, the pressure relief valve 120 is mounted in the top portion 11a of the housing 46'a. The pressure relief valve may be any suitable pressure relief valve, and may be similar to the pressure relief valve described below with respect to FIG. 8.

Figure 5:
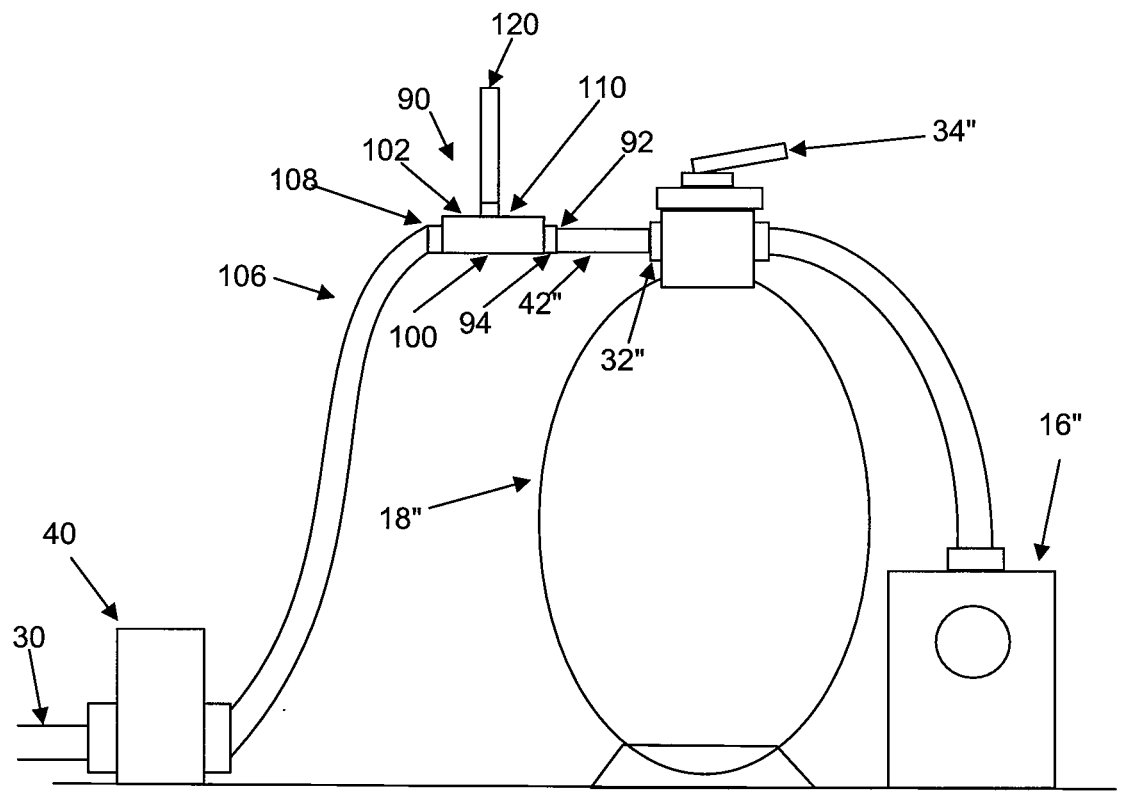
FIG. 5 is a side view showing diagrammatically the use of a pressure relief valve.
Figure 6:
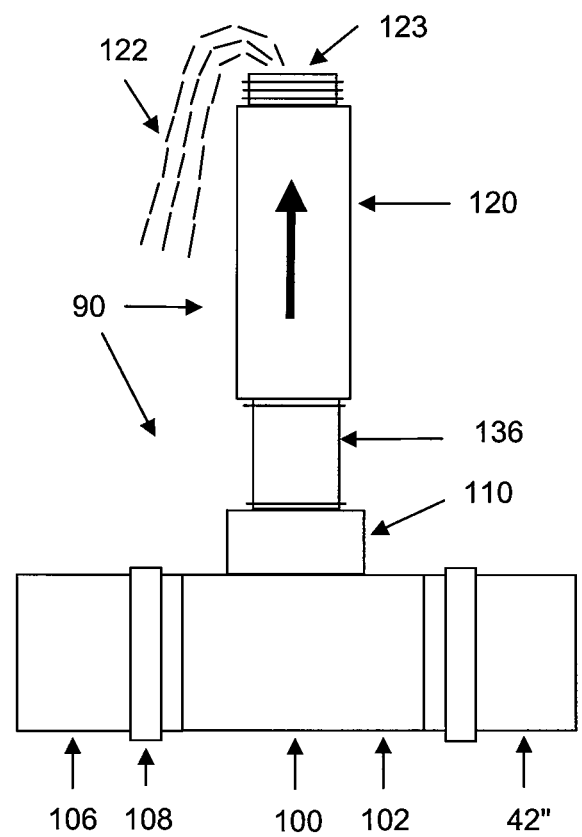
FIG. 6 is a side view showing a T-connection for the pressure relief valve of FIG. 5.

Referring to FIGS. 5 and 6, the pressure relief valve 120 may alternately be installed in a pressure relief valve assembly 90 installed between the backwash outlet 32 of pool filter 18 and dechlorinator 40 in order to protect vulnerable parts of the system. The pressure relief valve assembly 90 may be installed in a location where it can easily be seen by the operator, so that the operator can notice when the pressure relief valve assembly 90 has opened due to an overpressure. If the pressure relief valve is within the operator's view, then when the pressure increases within the backwash system causing the pressure relief valve to open and spill water, the spilled water stream from the pressure relief valve will be visible to and will indicate to the operator that it is time to change or clean the dechlorinator filter. (However, if the dechlorinator filter filters out only relatively coarse particles and allows fine particles to pass through, then such filter is unlikely to clog and a pressure relief valve would be less needed, and may not be needed at all.)

FIG. 5 shows an example of a pressure relief valve assembly 90 installed in the system. As shown in FIG. 5, where double primed reference numerals indicate parts corresponding to those of the previous Figures, a short rigid pipe 42" as before is connected to the backwash or discharge water outlet 32" of the pool filter 18". Pipe 42" at its outlet end 92 is connected (e.g. by hose clamp 94) to the pressure relief valve assembly 90 (also shown in FIG. 6).

The pressure relief valve assembly 90 includes a T-fitting 100. T-fitting 100 has (see FIG. 6) a straight lower section 102 (the horizontal bar of an upside-down T). One end of straight section 102 is connected to the outlet end of pipe 42" as discussed above, to receive backwash or other waste water from the pool filter 18". The other end of straight section 102 is connected to another pipe or hose 106 (e.g. by a hose clamp 108). Pipe or hose 106 leads to, and carries a stream of waste water to, the dechlorinator 40 and the backwash hose 30.

The T-fitting 100 includes a third outlet 110 oriented at 90° to, and extending upwardly from, the straight section 102 (and forming the vertical stem of an upside-down T). A conventional commercially available pressure relief valve 120 is connected to the third outlet 110.

As mentioned, the objective of the pressure relief valve 120 is to protect against overpressure in equipment such as the pool filter 18, the dechlorinator 40, and the backwash hose 30. During backwashing, the pressure in these parts is normally very low but can rise to about 5 psi. Pressures substantially above 5 psi may indicate a problem, such as clogging of the dechlorinator filter 80. The pressure relief valve 120 is preferably adjustable and may be set to open at between 5 and 10 psi. Since the pressure relief valve 120 is mounted beside the pool filter 18 and is pointed straight upwardly (or it can be connected to a "u" shaped pipe fitting directing the overpressure flow downwardly), when pressure relief valve 120 opens, a stream of water 122 (FIG. 6) will flow from the outlet 123 of the valve 120. Depending on the overpressure, the water stream 122 will rise above the top of the pressure relief valve 120, but whether or not it does so, the water stream 122 will be highly visible to any person working at or near the pool filter 18 (which is where an operator would commonly be during backwashing, in order to operate the backwash control 34). This will provide a warning that the dechlorinator filter 80 should be promptly cleaned or replaced.

Figure 7:
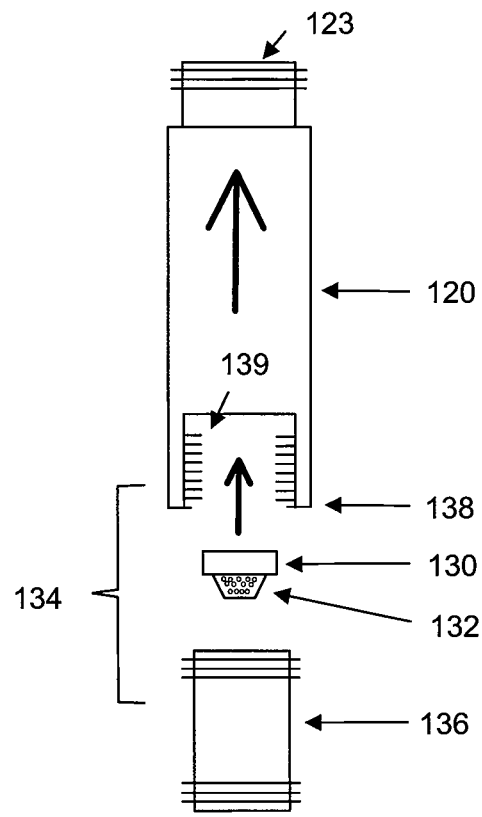
FIG. 7 is an exploded side view showing the pressure relief valve of FIG. 5, with a filter washer, ready to be inserted into a connection using such pressure relief valve.
Figure 8:
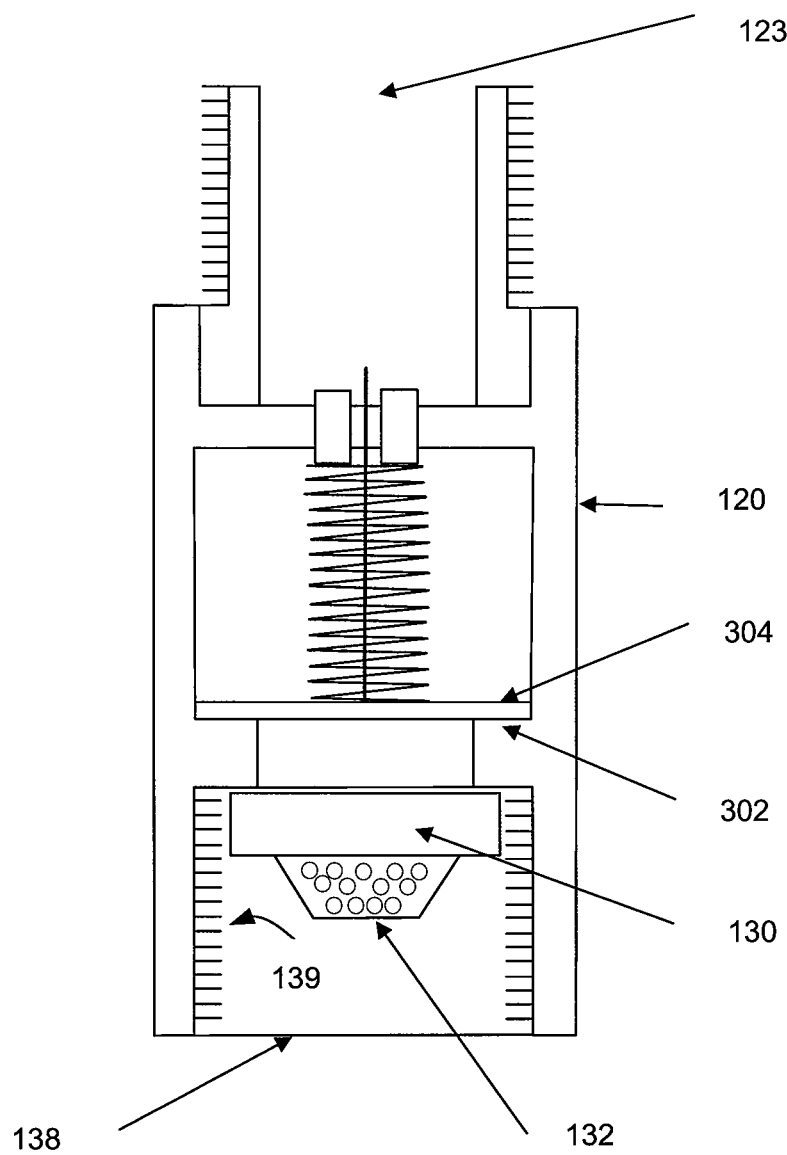
FIG. 8 is a simplified side sectional view of a typical pressure relief valve but having a filter washer installed therein.

A problem with using a pressure relief valve 120 may that such valve may tend to rapidly clog with debris from the backwash water. If it is clogged, the pressure relief valve will then no longer open reliably at a preset pressure. Therefore, as shown in FIGS. 6 to 8, the pressure relief valve 120 may be protected from debris by connecting it (as discussed above) to the third outlet 110, preferably in the upright and vertically extending orientation shown. Since pressure relief valve 120 is now at right angles to the flow of the discharge water stream through the T-fitting 100, and does not receive or carry the full flow of such stream received from pipe 42", therefore pressure relief valve 120 is much less likely to clog. (In fact, during normal operation, pressure relief valve 120 and its connecting outlet 110 do not carry any of the discharge water flow from pipe 42)

Referring to FIGS. 6 and 7 and 8, the pressure relief valve 120 may be further protected from debris in the discharge water stream by a conventional rubber hose washer 130 having a perforated center section 132. To use this system, a short threaded nipple 136 (commonly found in plumbing stores) is first screwed into the "T" outlet 110. The hose washer 130 is placed in the inlet opening 138 of the pressure relief valve 120 (at the inner ends of the female threads 139 of inlet opening 138). Then the pressure relief valve 120 is screwed onto the nipple 136, clamping the washer 130 between them.

It will be understood that the pressure relief valve outlet section 110 is preferably of smaller diameter than the straight first pipe section 102, since otherwise the flow of water will tend to travel into the outlet 110 to a greater extent than necessary. In addition, although outlet 110 is shown oriented at 90° to the straight pipe section 102, this angle can be varied as desired so long as the angle is not so shallow as to cause clogging.

It is also noted that the rapid flow of water past the third outlet 110 may cause turbulence in the T-fitting 100 in the vicinity of outlet 110. Such turbulence may tend to clean the area and prevent the perforated washer 130 from clogging. It is found that the arrangement shown works well and does not tend to clog.

A typical pressure relief valve 120 is shown in FIG. 8 and indicates the position of the perforated hose washer 130. The pressure relief valve 120 can be of the adjustable type. The purpose of the pressure relief valve 120 is to bleed off pressure in excess of 5 psi within the dechlorination assembly and all of the associated components. The function of the perforated washer 130 is to prevent debris from traveling past the female threads 139 of valve 120 as shown in FIG. 7. With this arrangement, the delicate inner workings of the pressure relief valve 120 are less likely to clog. As mentioned, clogging can cause a pressure build up which may damage a component of the pressure relief valve or another part of the system. The clogging may also allow debris to enter between the pressure relief valve seat 302 and its disc seal 304, preventing the pressure relief valve from closing (i.e. it jams open), causing water to spill unnecessarily from outlet 123.

Referring back to FIG. 4A, this embodiment also includes a drain (i.e. a drain that is separate from the outlet 44'). The drain is at the bottom portion of chamber 56a, and is plugged by a manually removable drain plug 68'a.

Figure 9:
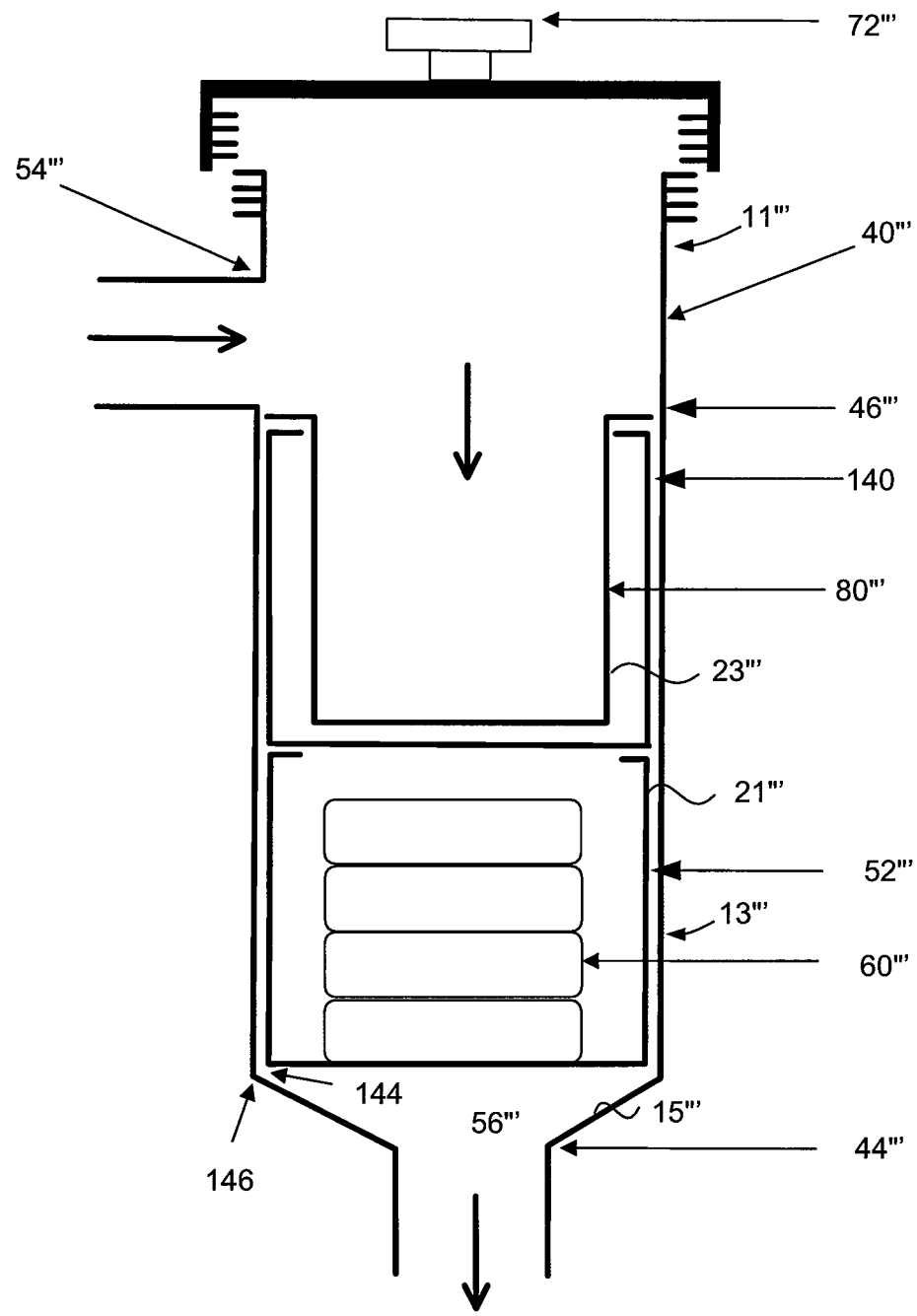
FIG. 9 is a side sectional view showing another form of a fixedly mounted dechlorinator.

Another flow path variation is shown in FIG. 9, where triple primed reference numerals indicate parts corresponding to those of the previous drawings. FIG. 9 shows a dechlorinator 40''' similar to those previously described, except that the outlet 44''' is in the bottom surface 15''' of the housing and is directed vertically downwardly, instead of horizontally. In addition, FIG. 9 shows that filter 80''' is a bag filter, rather than being a cartridge filter.

In the embodiment shown, a perforated basket 140 provides the filter support 23'''. The tablet support 21''' is seated on the bottom portion 13''' of the housing 46''', and the filter support 23''' is seated on the tablet support 21'''. Specifically, the tablet basket 52''' is seated on a circular contact line 144, constituted by the "corner" 146 where the housing shape changes from cylindrical to conical. The perforated basket 140 is seated on the tablet basket 52'''.

A single perforated basket 52 (not shown) can be used instead of two baskets, and would be of sufficient length both to house the tablets 60''' and to support the bag filter 80''' within housing 46'''. Such single basket 52''' would be supported at 44''' by contacting the corner at 146''' thus eliminating one basket.

In use, dechlorinator 40''' will normally be suspended above the ground so that its outlet 44''' is spaced above the ground for drainage purposes. In this version, chamber 56''' is unlikely to fill with water unless the backwash hose 30 (not shown in FIG. 9) connected to outlet 44''' becomes clogged. If that happens, then the operator will be able to detect such an event by seeing that the flow of water out of the backwash hose has been reduced to a trickle or has stopped. Alternatively (and preferably), the pressure relief valve 120 (not shown in FIG. 9) will open and discharge water, providing a visible indication of blockage to the operator. It will be seen that when the discharge hose 30 is removed from the outlet 44''' and provided that dechlorinator 40''' is left suspended above the ground, the dechlorinator 40''' will drain automatically and will not leave the tablets 60''' sitting in a pool of water. The placement of an air induction valve in this version, as previously mentioned in earlier versions will allow for complete drainage of chamber 56''' keeping the tablets from being submerged between dechlorination uses.

In an alternate embodiment, shown in FIG. 9A, where reference numerals ending in an 'a' indicate parts corresponding to those of FIG. 9 the housing 46'''a includes an inwardly projecting formation 50'''a, and the tablet support 21'''a is suspended from the inwardly projecting formation by a lip 25'''a, as described hereinabove with respect to FIG. 1. The filter support 23''a further includes a lip 27. The filter support 23'''a and filter 80'''a are nested within the tablet support 21'''a, and the lip 27 is seated on the lip 25'''a.

Figure 9A:
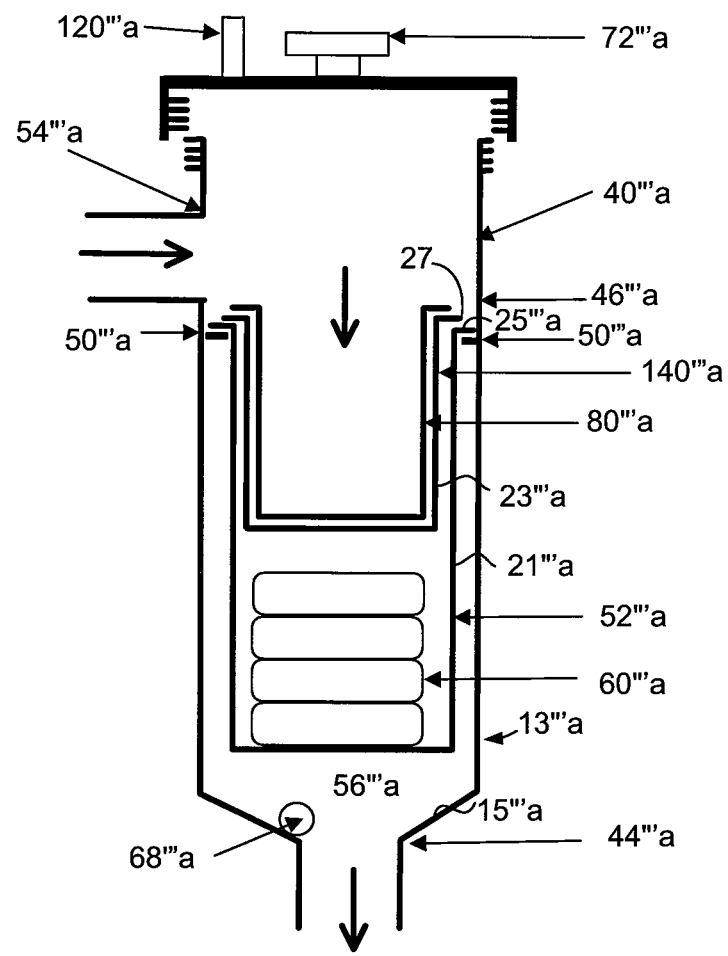
FIG. 9A is a side sectional view showing another embodiment, similar to that of FIG. 9, but showing a pressure relief valve and a drain plug, and also showing an alternate tablet support and filter support.

In the embodiment of FIG. 9A, the dechlorinator 40'''a further includes a drain that is plugged by a drain plug 68'''a, and a pressure relief valve 120'''a.

In the embodiment of FIG. 9A, a space is located between the sides of the tablet support 21'''a and the side of the housing 46'''a. Accordingly, even if the bottom of the tablet support 21'''a becomes clogged, water may exit the tablet support 21'''a through the sides thereof and pass into the space, so that it may still reach the outlet 44'''a. That is, clogging of the bottom of the tablet support 21'''a will not result in clogging of the entire dechlorinator 40'''a.

Figure 9B:
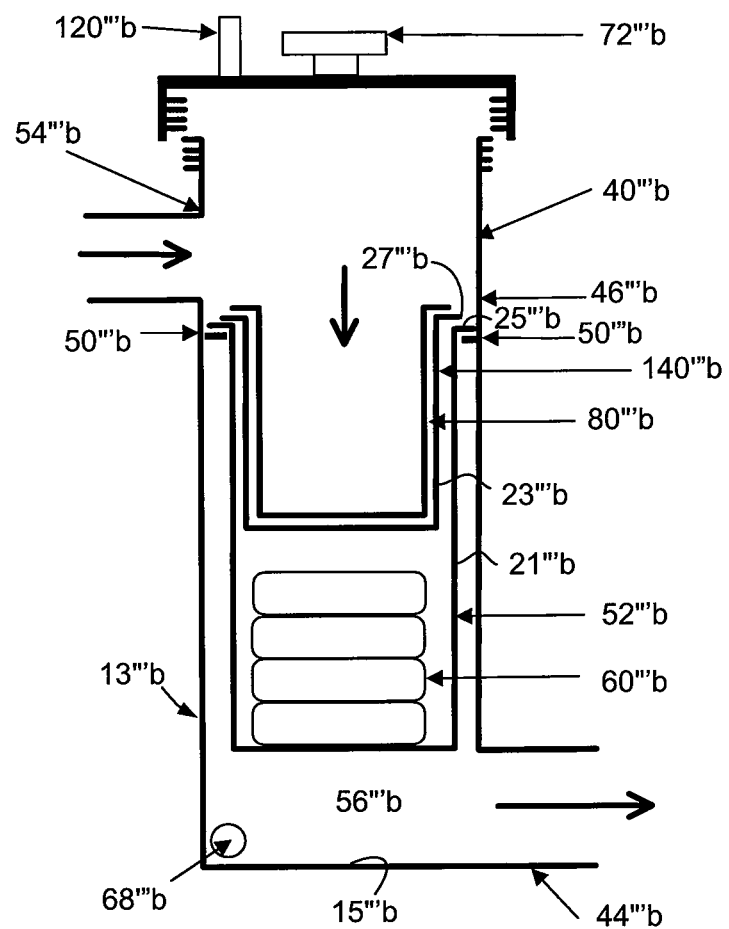
FIG. 9B is a side sectional view showing another embodiment, similar to that of FIG. 9A, but showing an alternate outlet.

In a further alternate embodiment, shown in FIG. 9B, having the same features as FIG. 9A, where triple primed reference numerals ending in a 'b' indicate parts corresponding to those of FIG. 9, the outlet 44'''a is directed horizontally.

In any of the above embodiments, the dechlorination tablets may be generally loose within the tablet support, as shown, or housed within a tablet holder (as described above) within the tablet support. An exemplary tablet holder is described below with regards to FIG. 18A to 20.

Figure 10:
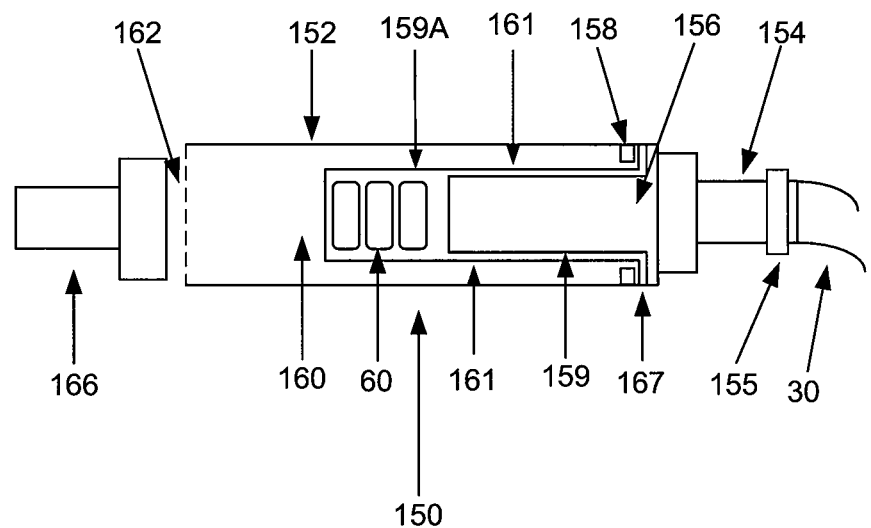
FIG. 10 is a side sectional view showing a cylindrically-shaped dechlorinator.

Instead of a relatively large dechlorinator 40 permanently (or even temporarily) mounted on the pool filter 18 or elsewhere on the pool equipment, a user may prefer to have a small, light dechlorinator which can easily be carried from one location to another. Such dechlorinator can be connected to the discharge end of the discharge (backwash) hose 30. An example of such an arrangement is shown in FIG. 10. FIG. 10 shows a small and light cylindrically-shaped canister 150 having a tubular body 152 with a tubular inlet fitting 154 of appropriate size projecting from an inlet end of body 152. The backwash hose 30 can be connected to the inlet fitting 154 by a hose clamp 155, or other suitable means.

The body 152 of the canister 150 includes an inner chamber 156 having an inwardly projecting annular ridge 158 therein to support a perforated basket 159A. A bag filter 159 in turn rests at 167 within the perforated basket 159A. The perforated basket 159A also holds the tablets 60. This feature of containing the tablets 60 within the perforated basket 159A prevents the perforated end plate 162 (described below) in canister 150 from being clogged by the tablets (which could occur if the tablets were loose in the canister body 152). The tablets 60 are also supported in a position spaced away from the body 152. When canister 150 is used in the horizontal position, the tablets 60 remain dry when water flow through canister 150 has stopped, since as shown, the tablets 60 are elevated above the body 152 as indicated by space 161 in FIG. 10.

The filtered, dechlorinated water normally leaves canister 150 via a perforated end plate 162. However, if desired, instead of having a perforated end plate 162 as shown for the canister 150 in FIG. 10, an optional adaptor 166 may be connected to the downstream end of the canister 150 (e.g. by a thread or an adaptor, not shown), so that an additional length of backwash hose can be connected to the end of the canister 150 if necessary.

Figure 11:
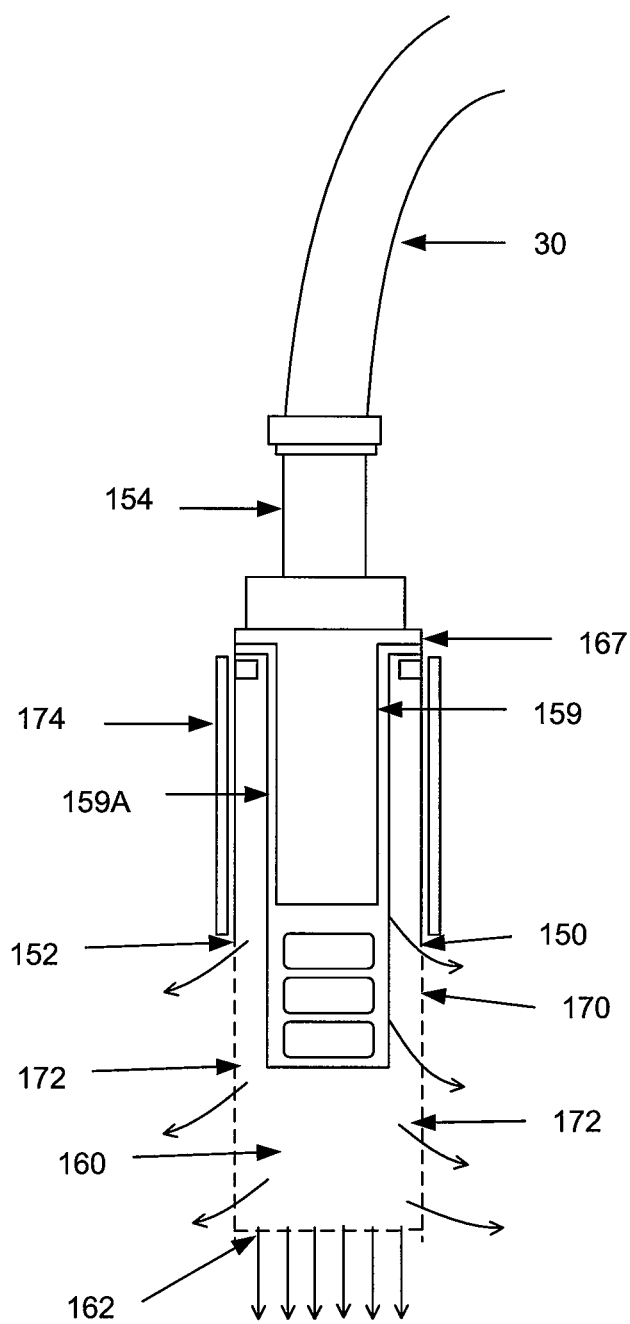
FIG. 11 is a side sectional view showing a cylindrically-shaped dechlorinator with a built-in flow control, the flow control being open.
Figure 12:
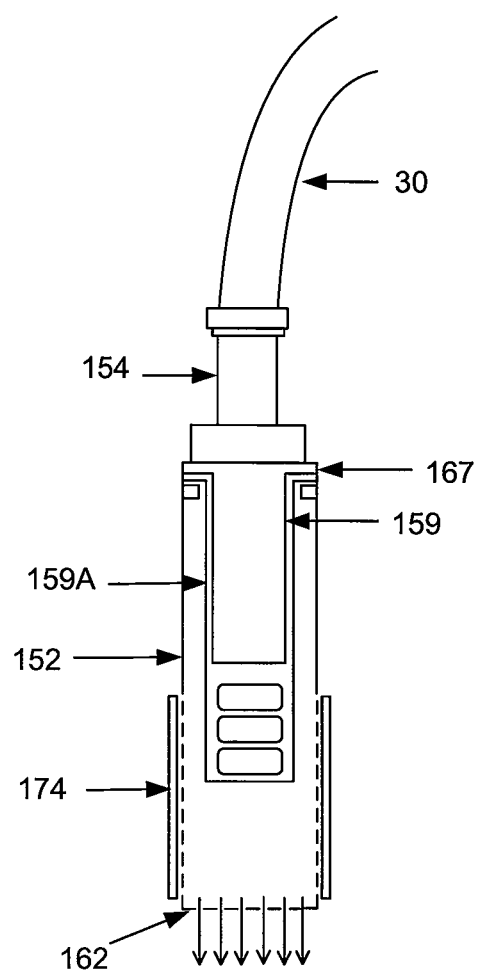
FIG. 12 is a side sectional view showing the cylindrically-shaped dechlorinator of FIG. 11 with the flow control in closed position.

If desired, and as shown in FIGS. 11 and 12, the second chamber 160 of canister 150 can have an outer cylindrical wall 170 which has perforations 172 therein. The perforations 172 can be blocked or left clear by a sliding collar 174. The collar 174 can slide along the body 152 and can be held in open position as shown in FIG. 11 or closed position as shown in FIG. 12 by a detent or lock (not shown). When the collar 174 is open (i.e. it leaves the side perforations 172 unobstructed as shown in FIG. 11), then water is discharged from the canister 150 with less obstruction than if perforations 172 were not open. This results in a lower pressure in the backwash hose 30 and a lower velocity of water discharge from the canister 150. When the sliding collar 174 covers the side perforations 172 as shown in FIG. 12, the pressure and water discharge velocity in the system are increased (since the water can now leave only through the holes in perforated end plate 162). This ability to control the velocity of the stream of filtered, dechlorinated water leaving the canister 150 increases the flexibility of the system in adapting to various conditions.

Reference is next made to FIGS. 13 to 16, which show another embodiment of a dechlorinator 200. The dechlorinator 200 shown in FIGS. 13 to 16 is preferably sufficiently small and light so as to be held by hand, and is intended to be placed only at the discharge end of a backwash or other discharge hose 30, and not in the middle of a discharge hose.

The dechlorinator 200 includes among its components a filter bag 202 (preferably disposable, although bag 202 can be washable), and an outer porous net bag 204 (also referred to herein as a dechlorination bag 204) which will hold a dechlorinating tablet 60. The net bag 204 is substantially longer and slightly wider than the filter bag 202, so that the filter bag 202 will fit inside the net bag 204 to create a space 240 (FIG. 14) inside the net bag and located between the free ends 232, 234 of the two bags. The filter bag 202 and dechlorination bag 204 are preferably constructed from a flexible material, and are without a fixed shape, however they may alternately be constructed from a stiff material and be of a fixed shape.

Figure 13:
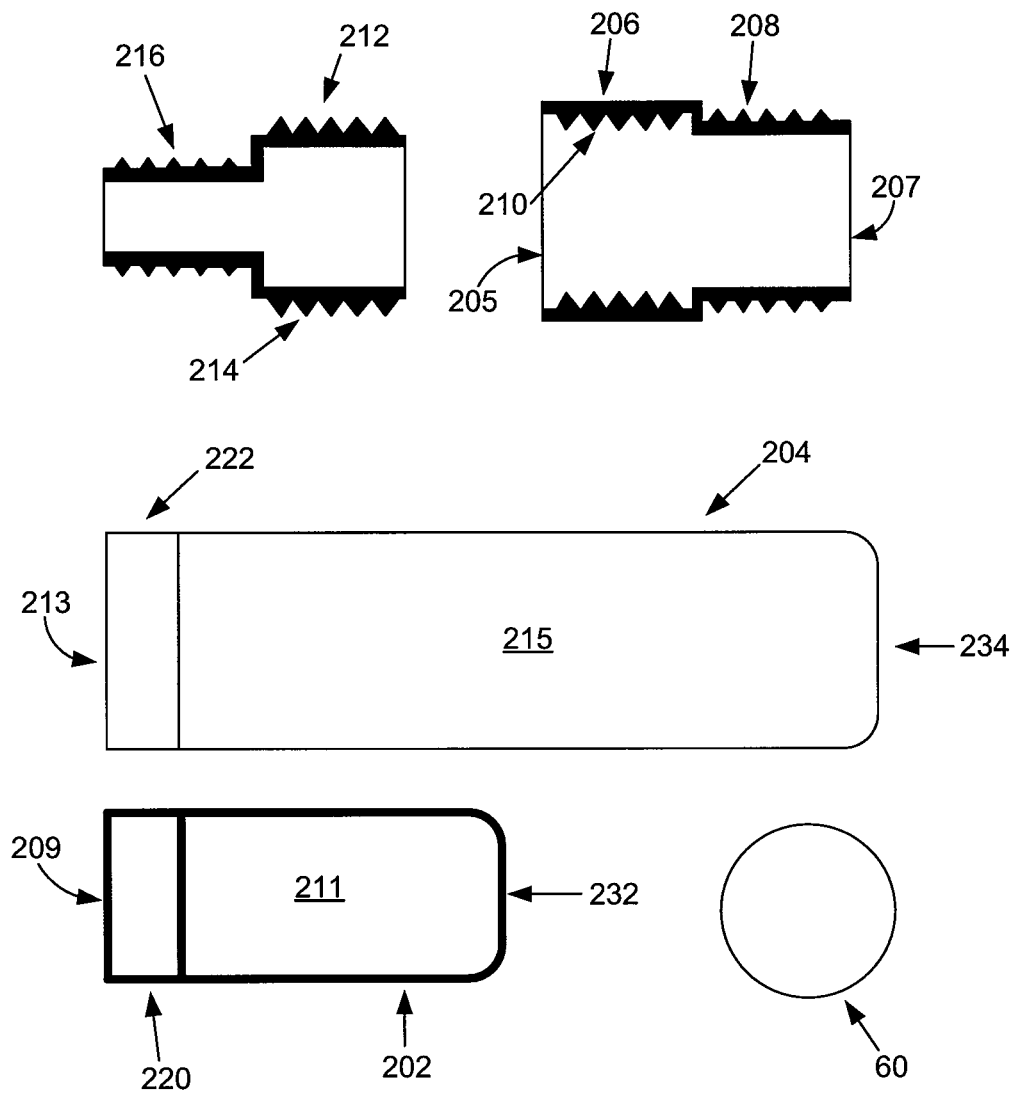
FIG. 13 is a plan view showing the main components of another embodiment of a dechlorinator.
Figure 15:
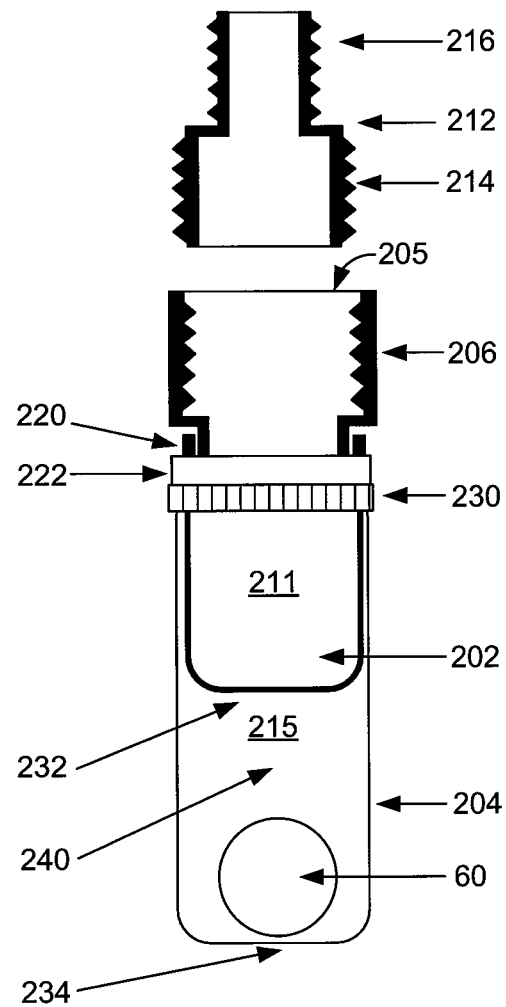
FIG. 15 is a side sectional view of the assembly of FIG. 14 further assembled with additional components.

Referring to FIGS. 13 and 15, both bags are connected to a pipe fitting 206. The pipe fitting has an inlet end 205 and an outlet end 207, and a flow passage between the inlet end 205 and the outlet end 207. The outlet end 207 is adapted for connection to the filter bag 202 and dechlorination bag 204. Specifically, in the embodiment shown, the outlet end 207 has a barbed profile 208 to receive the two bags 202, 204. The inlet end 205 is adapted for connection to a conduit, such as an adaptor 212, or a hose, so that the flow passage is in fluid communication with the conduit. Specifically, the inlet end 205 includes threads 210 and may receive one end of an adaptor 212 having a thread 214 thereon. The end of adaptor 212 remote from the thread 214 has a barbed profile 216 so that it can easily be connected to a backwash hose 30 (e.g. using a hose clamp 231).

The filter bag 202 is adapted to filter the water flowing out of the flow passage of the fitting 206. Specifically, the filter bag 202 has an upstream open end 209 and defines an interior volume 211. The open end 209 is removably securable to the outlet end 207 of the fitting 206, such that water exiting the flow passage of the fitting 206 enters the interior volume 211 of the filter bag 202 and flows through the filter bag 202. Specifically, the filter bag has a collar 220 that may be clamped over the outlet end 207 of the fitting 206.

The dechlorination bag 204 houses at least one dechlorination tablet 60 in the space 240. The dechlorination bag 204 is adapted such that water exiting the filter bag 202 enters the dechlorination bag 204, and at least some of the water contacts the dechlorination tablet 60. Specifically, in the embodiment shown, the dechlorination bag 204 includes an upstream open end 213 and an interior volume 215. The open end 213 is removably securable to the fitting 206 over the open end 209 of the filter bag 202 and the filter bag 202 is removably receivable within the dechlorination bag 204. Specifically, in the embodiment shown, the filter bag 202 is insertable into the dechlorination bag 204, and the dechlorination bag 204 has a collar 222 that may be positioned over the collar 220, and clamped over the outlet end 207 of the fitting 206 together with the collar 220. Accordingly, at least some of the water exiting the filter bag 202 enters the interior volume of the dechlorination bag 204, and contacts the dechlorination tablet 60.

The dechlorination bag 204 preferably has a greater pore size than the filter bag 202, so that materials passing from the filter bag 202 into the dechlorination bag 204 do not clog the dechlorination bag 204.

Use of the dechlorinator 200 is very simple and is typically as follows. (It should be noted that the order of the steps described below can be changed according to user convenience.)

Firstly, the collar 220 at the open end 209 of the filter bag 202 is placed over the barbed profile 208 at the outlet end 207 of pipe fitting 206. Next, a tablet 60 is placed inside the net bag 204, and positioned at the free end 234 of net bag 204.

Figure 16:
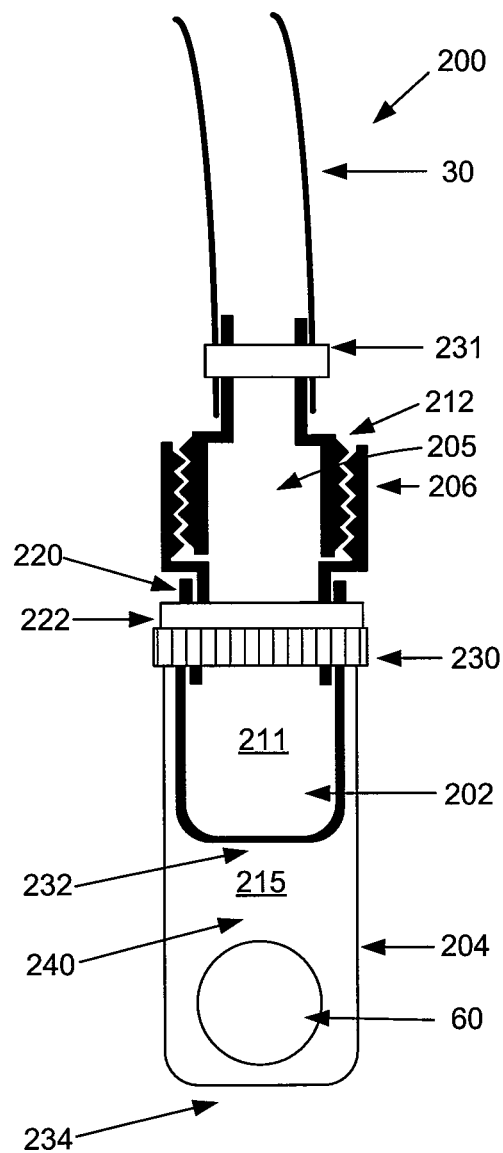
FIG. 16 is a side sectional view of the dechlorinator of FIG. 13 fully assembled and connected to a backwash hose.

Next, the net bag 204 is slid over filter bag 202 until the collar 222 of the net bag 204 and collar 220 of the filter bag 202 overlap on the barbed profile 208 of pipe fitting 206. This is accomplished by opening up the upstream opened end 213 of net bag 204 and sliding it up the entire length of filter bag 202 starting at free end 232 of filter bag 202 until collar 222 of the of the opened end 213 of net bag 204 covers collar 220 of the opened end 209 of filter bag 202 on the barbed profile 208 of outlet end 207 of fitting 206. The two collars 220, 222 are then secured in place over barbed surface 208, preferably by a hose clamp 230 (FIGS. 15, 16).

Figure 14:
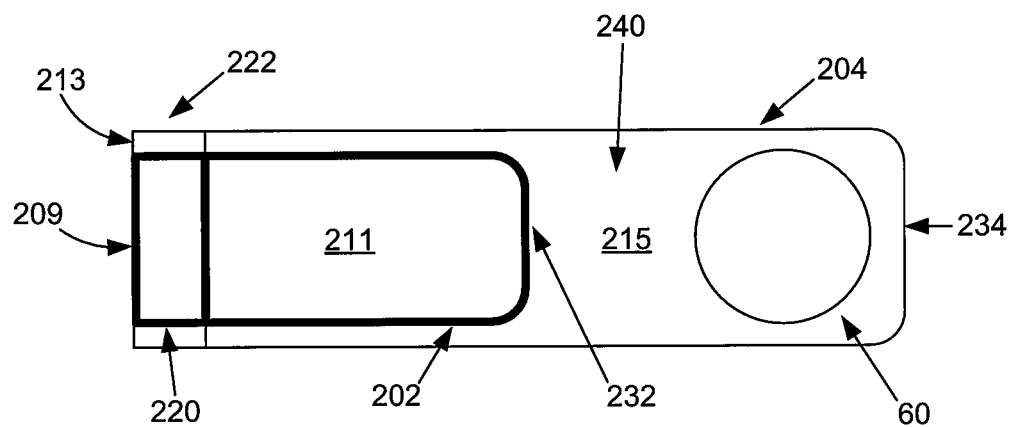
FIG. 14 is a side sectional view of the assembly of a filter bag, a net bag and a dechlorinating tablet for the dechlorinator of FIG. 13.

The assembly of the two bags with the dechlorinating tablet is shown in FIG. 14, and such assembly, with the collars of the two bags clamped onto the barbed surface 208 of pipe fitting 206, is shown in FIG. 15.

Finally, the adaptor 212 is screwed into the pipe fitting 206, and the backwash hose 30 is connected in a conventional manner to the barbed end 216 of adaptor 212 using a hose clamp 231 or other suitable means. The two bags may be secured to a backwash (discharge) hose using any other means including a one piece coupler and hose clamps. The dechlorinator described above may be used (in whole or in part) in conjunction with any of the canister type dechlorinators described herein.

In use, a stream of discharge water from the backwash hose 30 travels through the adaptor 212 and pipe fitting 206, into and through the filter bag 202 and the net bag 204. Thus, the stream of discharged water is filtered, and at least some of the stream then contacts the dechlorinating tablet(s) 60 for dechlorination, and is then discharged onto the road or any other suitable location. Normally, one dechlorinating tablet 60 placed inside net bag 204 will be sufficient to dechlorinate a flow of pool backwash water. In fact, the tablet 60 may erode more quickly than is necessary, thus potentially wasting the dechlorinating material. (This may occur if the velocity of the water stream over the tablet 60 is too high.)

By making the net bag 204 substantially longer than the filter bag 202, thus creating a relatively long space 240 between the ends of the two bags, and by positioning the tablet 60 near the free end 234 of the net bag 204, the velocity of the water stream passing over tablet 60 may be reduced.

This reduction occurs because the wall of the net bag 204 which defines the space 240 in effect creates extra area through which the water stream may leave the dechlorinator 200. The extra area reduces the water velocity through any unit area of the net bag 204, thus reducing unduly rapid erosion of the tablet 60. (In one example, bags 202, 204 were one foot and two feet long respectively, making space 240 about one foot long.) The filter bag 202 also slows the water flow by forcing the water through the tiny pores in the filter bag.

Figure 17:
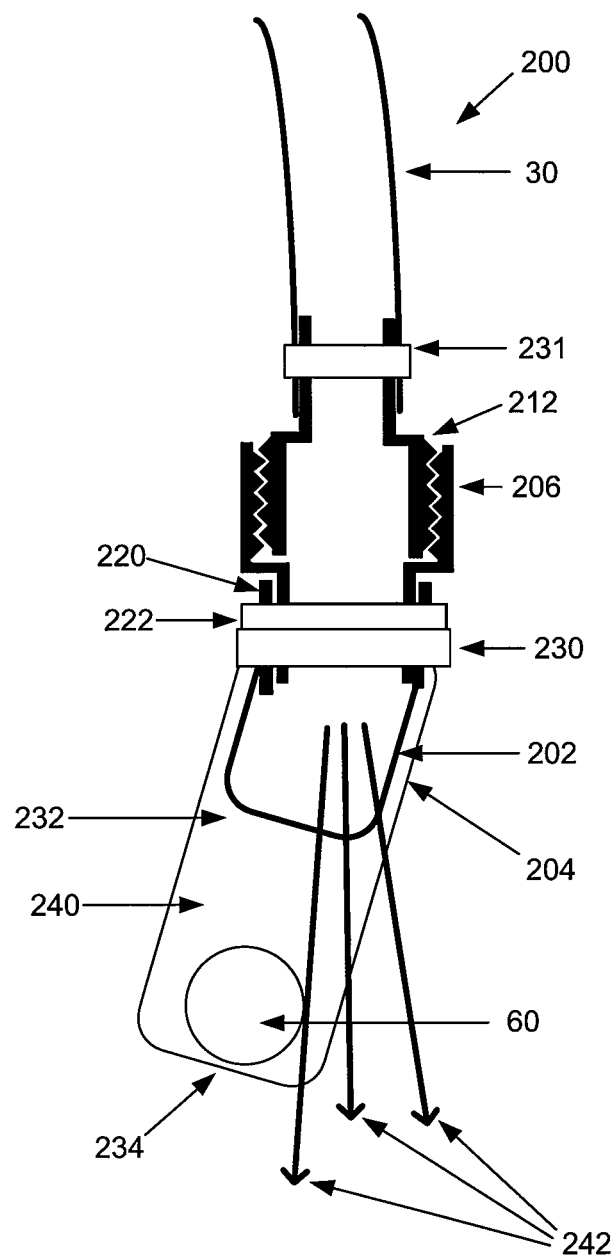
FIG. 17 is a side sectional view of a modification of the FIG. 16 dechlorinator.

Many possible arrangements can be used to reduce the velocity of the water flow passing over tablet 60 in net bag 204. Another such arrangement is shown in FIG. 17. In FIG. 17, the filter bag 202 and net bag 204 are positioned so that they are oriented at an angle with respect to pipe fitting 206. The water stream from backwash hose 30 tends to travel axially through and out of the pipe fitting 206, and then the water stream diverges gradually as indicated by arrows 242 in FIG. 17 (somewhat like the divergence of the light beam from a flashlight). Tablet 60 may as before be placed at or near the free end 234 of the net bag and will be located at the side of the highest velocity components of discharged water. Again, this reduces the rate of erosion of tablet 60.

Figure 18A:
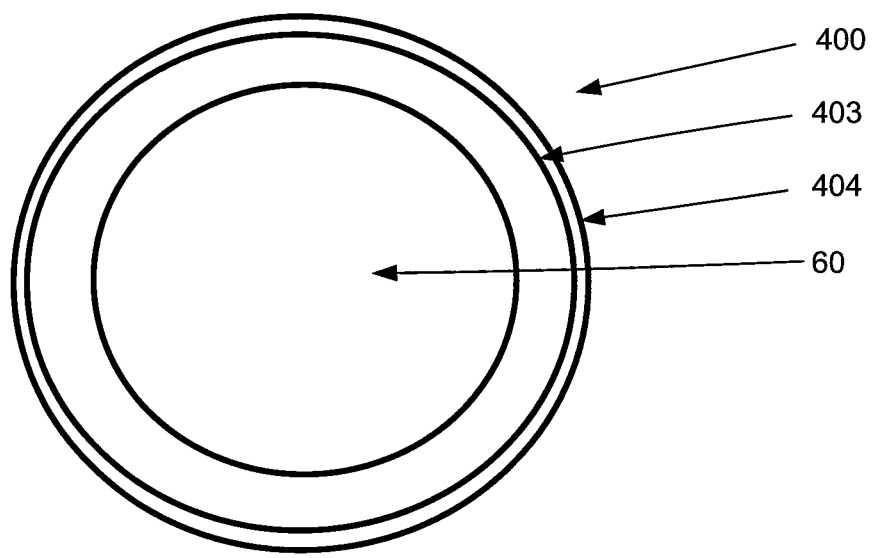
FIG. 18A is a plan view of a holder which holds a dechlorinating tablet and reduces the velocity and volume of water contacting the tablet.
Figure 18B:
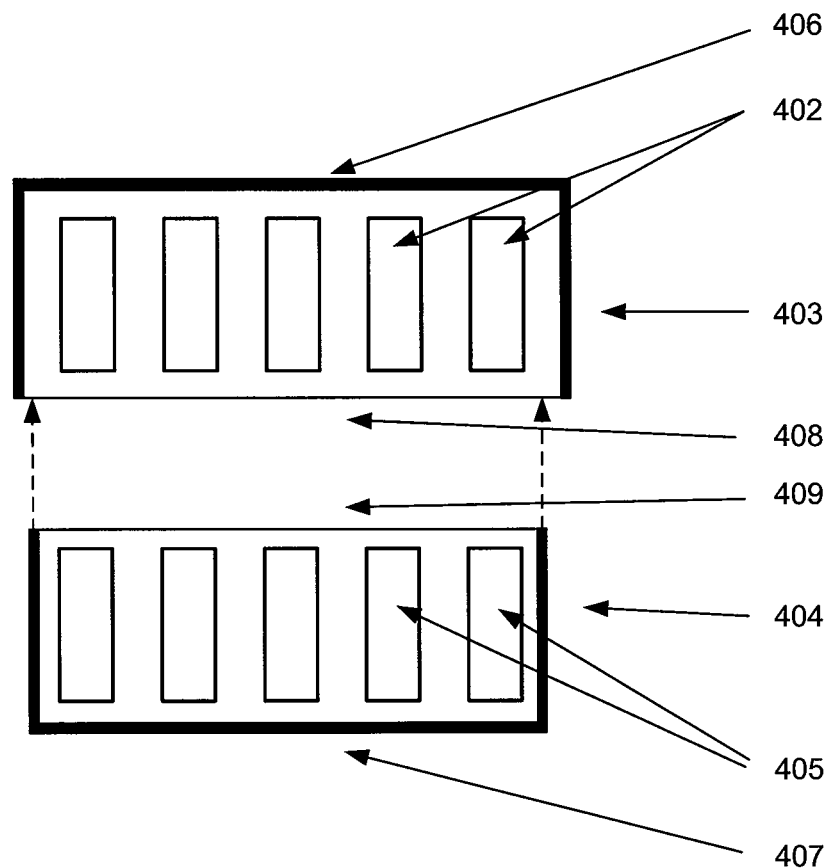
FIG. 18B is an exploded side view of two half-cup members which form the holder of FIG. 18A.

Another method of reducing the velocity of water which contacts the tablet 60 is shown in FIGS. 18A, 18B. These Figs. show a tablet holder 400 (as described in above), formed by two cup-shaped holders 403, 404. Holder 404 fits snuggly within the holder 403.

Each holder 403, 404 has a closed end 406, 407 and an open end 408, 409 respectively. Each holder 403, 404 also has a set of openings 402, 405 respectively, spaced around its cylindrical wall. The openings 402 and 405 may vary in size and spacing.

Figure 19:
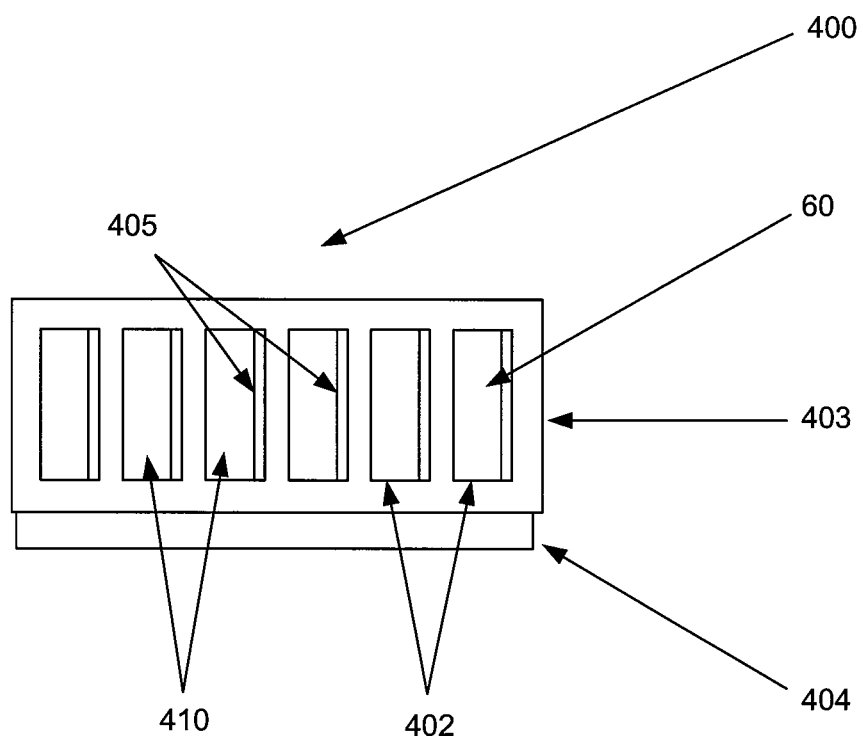
FIG. 19 is a side view showing the two half-cup members of FIG. 18A and FIG. 18B assembled and adjusted in an exemplary setting.

When cup-shaped holders 403 and 404 are nestled within one another with closed ends 406, 407 on the outside, this forms a complete container 400 encasing the tablet(s) 60. The size of the openings in the wall of container 400 can be adjusted to be larger or smaller, or to be fully opened or fully closed, by twisting holders 403 and 404 in opposing directions until the desired opening size has been achieved. FIG. 19 shows a holder 400 having composite openings 410 in the mainly opened position. (Composite openings 410 are formed by the overlapped portions of openings 402, 405.) The large composite openings 410 shown in FIG. 19 allow for plenty of water contact with tablet 60.

Figure 20:
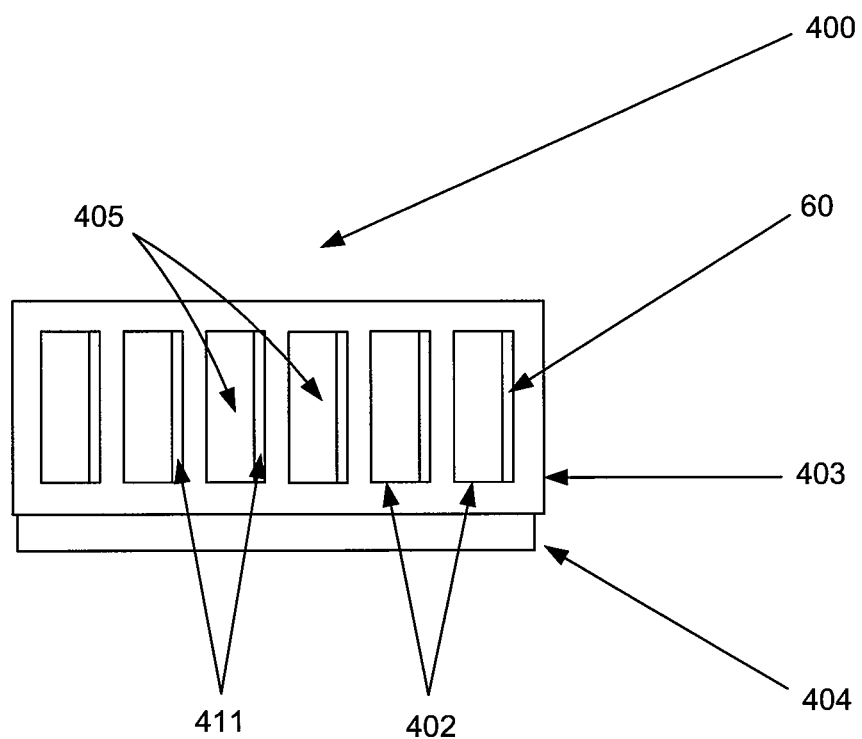
FIG. 20 is a side view similar to FIG. 19 and showing a different adjustment for the half-cup members.

FIG. 20 shows a holder 400 with composite openings 411 in the mainly closed position, limiting the velocity of water flow contacting tablet 60 and reducing the decay rate of the tablet 60. The larger the composite openings, the greater the amount of water that contacts the tablet(s) 60 held within holder 400. The ability to reduce the velocity and volume of water which contacts the tablet(s) 60 allows the user to control the rate of tablet 60 decay. Another method of reducing tablet decay is to place tablet(s) 60 into a porous bag, for example a porous bag shaped like a sock (not shown) and placing it within the flow of the water stream of any of the dechlorinators listed herein.

Figure 21:
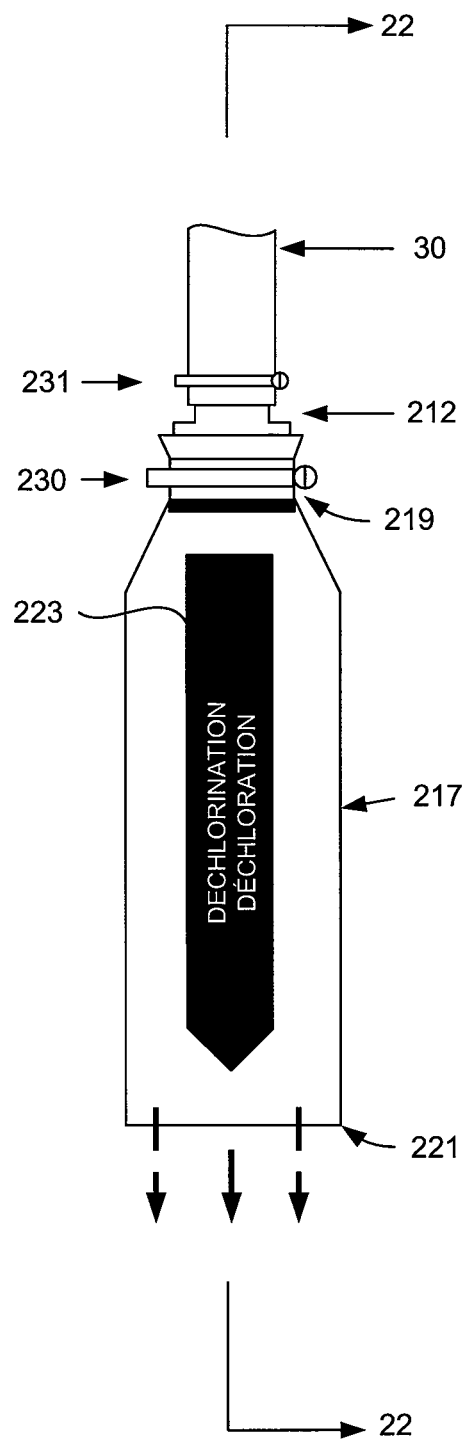
FIG. 21 is a plan view of the dechlorinator of FIG. 13 fully assembled and connected to a backwash hose, with a tube secured over the dechlorinator.
Figure 22:
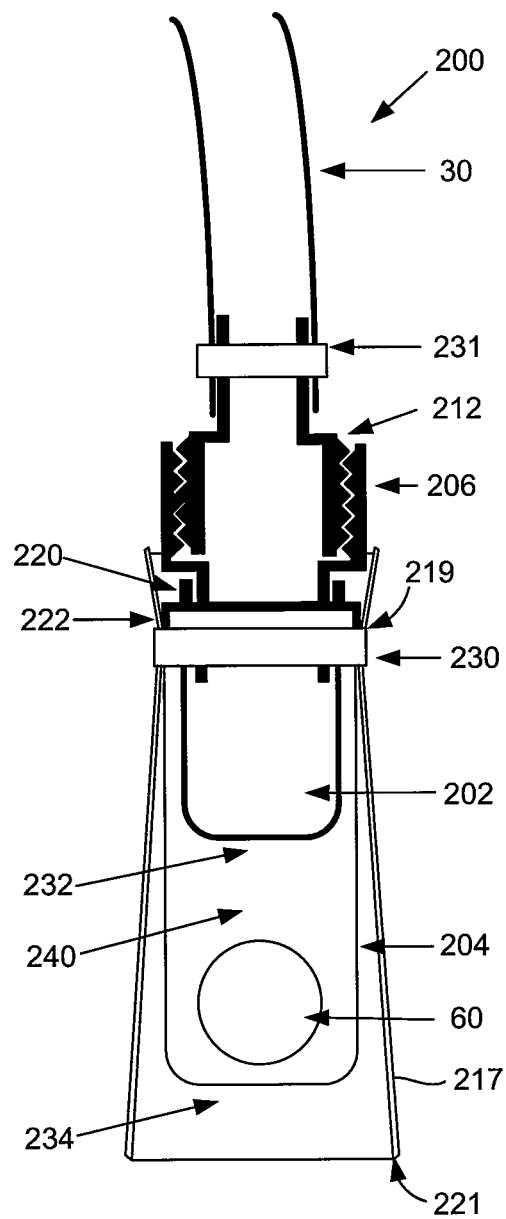
FIG. 22 is a cross-section taken along line 22-22 in FIG. 21.

Referring now to FIGS. 21 and 22, in some embodiments, a tube 217 may be positioned over the dechlorinator 200. The tube 217 may serve to direct the flow of water over the dechlorination tablet(s) 60. In the embodiment shown, the tube 217 is constructed from a non-porous flexible material, such as a polyethylene. The tube 217 includes a first open end 219 and a longitudinally opposed second open end 221. The first open end 219 of the tube 217 is secured to the fitting 206 over the dechlorination bag 204, preferably by clamping the first open end 219 of the tube 217 to the fitting 206 together with the dechlorination bag 204 and filter bag 202. The filter bag 202 and dechlorination bag 204 are at least partially received in the tube 217, and such that water exiting the dechlorination bag 204 exits the second open end 221 of the tube.

In the embodiment shown, an indicia 223 indicating that dechlorination is taking place within the tube 217 is displayed on the tube 217. The indicia may serve to demonstrate to neighbours, passersby, or environmental officers that the water being released from the hose 30 is dechlorinated. In the embodiment shown, the indicia 223 includes an arrow showing the direction of flow, as well as text that reads "Dechlorination" (i.e. English) and "Dechloration" (i.e. French). In alternate embodiments, any other appropriate language may be used. Another function of the tube may be to direct discharged water over the tablet(s) by preventing such water flow from diverging away from the tablets, especially when the filter bag becomes laden with debris. The tube can be used independently or with any other dechlorinator mentioned herein.

Figure 23:
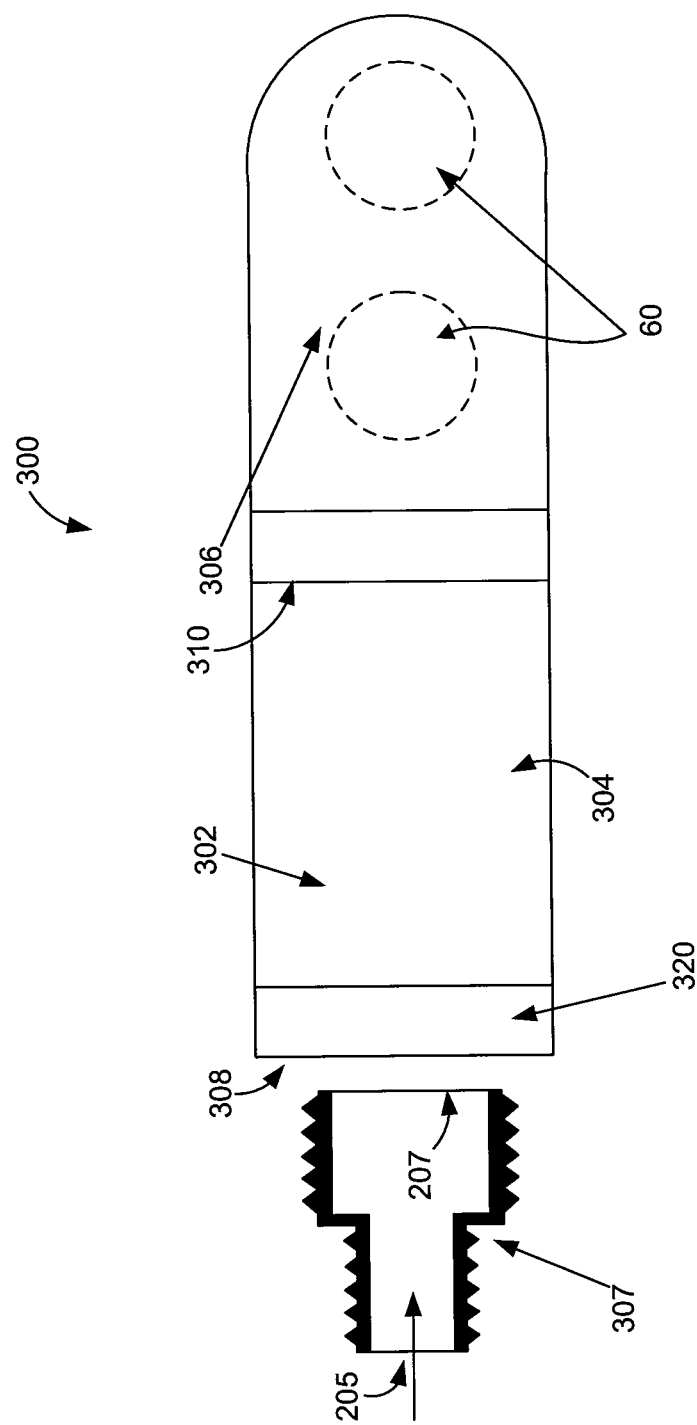
FIG. 23 is a view showing a fitting of another dechlorinator in cross section, and a porous bag of the dechlorinator in plan view.
Figure 24:
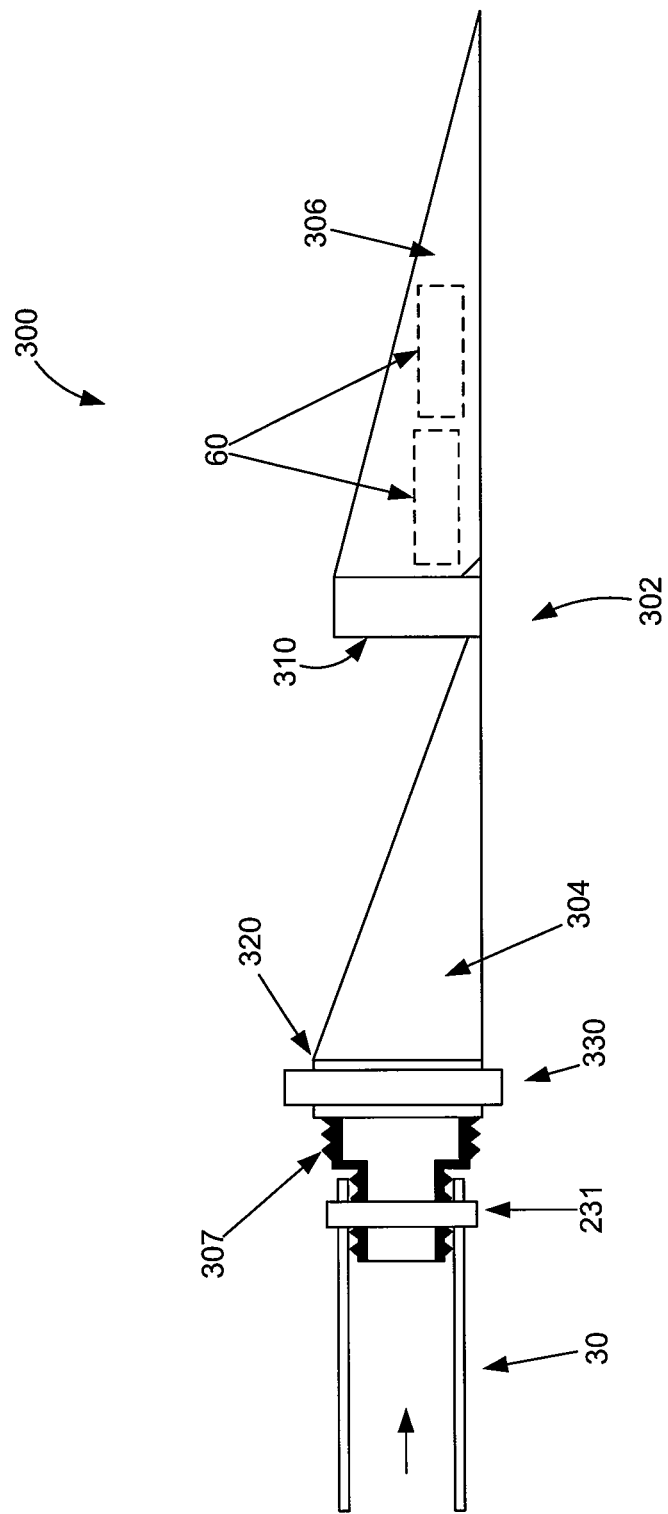
FIG. 24 is a side view of the dechlorinator of FIG. 21, in an assembled configuration.

Referring now to FIGS. 23 and 24, an alternate embodiment of a dechlorinator 300 is shown. This embodiment is similar to the embodiment of FIGS. 13 to 17. However, rather than a separate filter bag 202 and dechlorination bag 204, the dechlorinator 300 includes a single one-piece porous bag 302, which includes a filter compartment 304 and a dechlorination compartment 306. That is, the filter compartment 304 and the dechlorination compartment 306 are integral with the porous bag. The filter compartment 304 and dechlorination compartment 306 may be formed by stitching a porous material, such as a mesh, to form the two separate compartments. The porous bag 302 is securable to a conduit, such as an adaptor or a hose, with a fitting 307, which is similar to fitting 206.

Similarly to the filter bag 202, the filter compartment 304 is has an upstream open end 308 securable to the fitting 307 such that water exiting the flow passage of the fitting 307 enters the filter compartment 304 and flows through the porous bag 302. The upstream open end 308 has a collar 320 that may be secured to the fitting 307 using a clamp 330, similar to claim 230 described hereinabove.

The dechlorination compartment 306 is positioned downstream of the filter compartment 304 such that at least a portion of the water exiting the filter compartment 304 enters the dechlorination compartment 306. The dechlorination compartment 306 houses at least one dechlorination tablet 60. An opening 310 is defined in the dechlorination compartment 306 for the insertion of the dechlorination tablet(s) 60. In FIG. 24, the opening 310 is shown in a generally open configuration, so that the dechlorination compartment 306 is generally triangular; however in use, the opening 310 will not maintain the open configuration and the dechlorination compartment 306 will generally lie flat.

Similarly to the embodiment of FIGS. 13 to 17, the dechlorinator 300 may be used with a tube 217.

Although the dechlorinator embodiments shown have included a filter, it will be understood that where filtering is not required (this is the case in some municipalities), then the filter can be omitted and only the dechlorination feature can be used.

The above description has referred to exemplary embodiments of a dechlorinator. It will be appreciated that various changes can be made to the apparatus and methods described above, and all are intended to be included so long as they are within the scope of the accompanying claims.

The invention claimed is:

1. A small lightweight dechlorinator for removing chlorine from discharge water from swimming pools and from other chlorinated water, the dechlorinator being adapted to be hand-carried by a person, and comprising:
- a discharge water receiving portion and a dechlorination portion;
- the discharge water receiving portion comprising a connection member having an inlet for connection to a source of the discharge water and further having an outlet for connection to the dechlorination portion;
- the dechlorination portion comprising a mesh structure connected to the outlet of the discharge water receiving portion, the mesh structure having a filter for removing debris from the discharge water;
- the mesh structure further having a dechlorination tablet support located therein downstream of the filter;
- the tablet support being a part of the mesh structure and adapted to support a dechlorination tablet in the mesh structure for the discharge water flowing through the mesh structure to contact the tablet and thereby to be dechlorinated; and
- a tube comprising a first open end and a longitudinally opposed second open end, wherein the first open end of the tube is secured to the connection member, and the mesh structure is at least partially received in the tube, such that the tube is adapted to direct the discharge water over the tablet, and water exiting the mesh structure that has been filtered and dechlorinated exits the second open end of the tube.

2. The dechlorinator of claim 1, wherein the filter is located within the tablet support.

3. The dechlorinator of claim 2, wherein the filter and the tablet support each comprise a flexible mesh bag, the mesh bag of the filter being located within the mesh bag of the tablet support.

4. The dechlorinator of claim 3, wherein the filter and the tablet support bags each have a collar, the collar of one bag fitting over the collar of the other bag, and a clamp encircling the collars and clamping them to the connection member.

5. The dechlorinator of claim 3, wherein the mesh bag of the tablet support is longer than the mesh bag of the filter.

6. The dechlorinator of claim 4, wherein the mesh bag of the tablet support is longer than the mesh bag of the filter.

7. The dechlorinator of claim 1, wherein the filter and the tablet support are integral with the mesh structure.

8. The dechlorinator of claim 7, wherein the mesh structure is formed of a single piece of mesh.

9. The dechlorinator of claim 8, wherein the filter and the tablet support each comprise a flexible mesh compartment.

10. The dechlorinator of claim 9, wherein the single piece of mesh is stitched to form the compartments.

11. The dechlorinator of claim 9, wherein the compartment of the filter has a collar, and a clamp encircles the collar and clamps it to the connection member.

12. The dechlorinator of claim 10, wherein the compartment of the filter has a collar, and a clamp encircles the collar and clamps it to the connection member.

13. The dechlorinator of claim 1, wherein the filter and the tablet support each have pores therein, the size of the pores in the tablet support being greater than the size of the pores in the filter.

14. The dechlorinator of claim 1, wherein the mesh structure comprises an opening for insertion of a dechlorination tablet into the tablet support.

15. The dechlorinator of claim 1, wherein the tube is constructed from a generally non-porous and flexible material.

16. The dechlorinator of claim 1, further comprising at least one dechlorination tablet located in the tablet support.

17. A dechlorinator, comprising a discharge water receiving portion and a dechlorination portion, the discharge water receiving portion comprising a connection member having an inlet for connection to a source of discharge water and an outlet for connection to the dechlorination portion, the dechlorination portion comprising a flexible mesh structure connected to the outlet of the discharge water receiving portion, the mesh structure comprising a filter for removing debris from the discharge water, and a dechlorination tablet support located therein downstream of the filter, the tablet support being adapted to support a dechlorination tablet in the mesh structure for the discharge water flowing through the mesh structure to contact the tablet and thereby to be dechlorinated, the dechlorinator further comprising a tube comprising a first open end and a longitudinally opposed second open end, wherein the first open end of the tube is secured to the connection member, and the mesh structure is at least partially received in the tube, such that the tube is adapted to direct the discharge water over the tablet, and water exiting the mesh structure that has been filtered and dechlorinated exits the second open end of the tube, and wherein the filter and the tablet support each comprise a flexible mesh bag, the mesh bag of the filter being located within the mesh bag of the tablet support.

18. A dechlorinator, comprising a discharge water receiving portion and a dechlorination portion, the discharge water receiving portion comprising a connection member having an inlet for connection to a source of discharge water and an outlet for connection to the dechlorination portion, the dechlorination portion comprising a flexible mesh structure connected to the outlet of the discharge water receiving portion, the mesh structure comprising a filter for removing debris from the discharge water, and a dechlorination tablet support located therein downstream of the filter, the tablet support being adapted to support a dechlorination tablet in the mesh structure for the discharge water flowing through the mesh structure to contact the tablet and thereby to be dechlorinated, the dechlorinator further comprising a tube comprising a first open end and a longitudinally opposed second open end, wherein the first open end of the tube is secured to the connection member, and the mesh structure is at least partially received in the tube, such that the tube is adapted to direct the discharge water over the tablet, and water exiting the mesh structure that has been filtered and dechlorinated exits the second open end of the tube, and wherein the mesh structure is formed of a single piece of mesh, the filter and the tablet support each comprise a flexible mesh compartment, and the single piece of mesh is stitched to form the compartments.

19. The dechlorinator of claim 17, wherein the tube is constructed from a generally non-porous and flexible material, and further comprising at least one dechlorination tablet located in the tablet support.

20. The dechlorinator of claim 18, wherein the tube is constructed from a generally non-porous and flexible material, and further comprising at least one dechlorination tablet located in the tablet support.

21. The dechlorinator of claim 1, further comprising indicia on the tube indicating that dechlorination is taking place within the dechlorinator.

22. The dechlorinator of claim 21, wherein the indicia comprises at least one of:
- an arrow showing flow direction of the discharge water; and text indicating that dechlorination is taking place within the dechlorinator.

23. The dechlorinator of claim 19, further comprising indicia on the tube indicating that dechlorination is taking place within the dechlorinator.

24. The dechlorinator of claim 23, wherein the indicia comprises at least one of:
    an arrow showing flow direction of the discharge water; and text indicating that dechlorination is taking place within the dechlorinator.

25. The dechlorinator of claim 20, further comprising indicia on the tube indicating that dechlorination is taking place within the dechlorinator.

26. The dechlorinator of claim 25, wherein the indicia comprises at least one of:
    an arrow showing flow direction of the discharge water; and text indicating that dechlorination is taking place within the dechlorinator.

* * * * *